(12) United States Patent
Nakai et al.

(10) Patent No.: US 8,589,639 B2
(45) Date of Patent: Nov. 19, 2013

(54) MEMORY MANAGEMENT UNIT AND MEMORY MANAGEMENT METHOD FOR CONTROLLING A NONVOLATILE MEMORY AND A VOLATILE MEMORY

(75) Inventors: Hiroto Nakai, Yokohama (JP); Tatsunori Kanai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 375 days.

(21) Appl. No.: 12/884,601

(22) Filed: Sep. 17, 2010

(65) Prior Publication Data
US 2011/0131366 A1  Jun. 2, 2011

(30) Foreign Application Priority Data
Nov. 30, 2009  (JP) .................................. 2009-272771

(51) Int. Cl.
*G06F 12/00*  (2006.01)
(52) U.S. Cl.
USPC ............ 711/156; 711/103; 711/105; 711/118
(58) Field of Classification Search
None
See application file for complete search history.

(56) References Cited

U.S. PATENT DOCUMENTS

| | | | |
|---|---|---|---|
| 6,564,304 B1 * | 5/2003 | Van Hook et al. | ............. 711/154 |
| 2007/0283115 A1 * | 12/2007 | Freeman et al. | ............. 711/163 |
| 2008/0244165 A1 | 10/2008 | Kunimatsu | |
| 2009/0083478 A1 | 3/2009 | Kunimatsu et al. | |
| 2009/0164743 A1 | 6/2009 | Yoshii et al. | |
| 2009/0198874 A1 * | 8/2009 | Tzeng | ............................ 711/103 |
| 2010/0064111 A1 | 3/2010 | Kunimatsu et al. | |
| 2011/0066790 A1 * | 3/2011 | Mogul et al. | .................. 711/103 |

FOREIGN PATENT DOCUMENTS

| | | |
|---|---|---|
| JP | 6-089221 | 3/1994 |
| JP | 7-146820 | 6/1995 |
| JP | 2001-266580 | 9/2001 |
| JP | 2003-256275 | 9/2003 |
| JP | 2005-502120 | 1/2005 |

OTHER PUBLICATIONS

U.S. Appl. No. 13/050,528, filed Mar. 17, 2011, Miyagawa et al.
U.S. Appl. No. 13/052,203, filed Mar. 21, 2011, Yasufuku et al.
U.S. Appl. No. 13/076,952, filed Mar. 31, 2011, Kunimatsu et al.
Office Action issued Jun. 25, 2013, in Japanese Patent Application No. 2009-272771, filed Nov. 30, 2009 (with English-language Translation).

* cited by examiner

*Primary Examiner* — Shawn X Gu
(74) *Attorney, Agent, or Firm* — Oblon, Spivak, McClelland, Maier & Neustadt, L.L.P.

(57) ABSTRACT

According to one embodiment, a memory management unit which controls a first memory as a nonvolatile memory and a second memory as a volatile memory, the memory management unit includes, judging whether data in the first memory desired to be accessed is stored in the second memory, setting an error flag to issue error data when the data is not stored in the second memory, and reading, into a free space of the second memory, the data to be accessed in the first memory.

9 Claims, 25 Drawing Sheets

2-0. MMU judging operation flow (first embodiment)

Configuration example of page table

| | Flag | DRAM address | NAND address |
|---|---|---|---|
| 0 | | | |
| 1 | E | | |
| 2 | D | D1 | |
| 3 | N | | N1 |
| 4 | DN | D2 | N2 |
| 5 | DW | D3 | |
| 6 | | | |
| 7 | | | |

⋮

"Flag" indicates kind of physical page corresponding to relevant logical page
-E Not used (no physical page is allocated)
-D Page is on DRAM
-N Page is on NAND
-DN Page on NAND is being cached in DRAM
-DW DRAM cached from NAND has been rewritten

FIG. 3

2-0. MMU judging operation flow (first embodiment)

2-1. Reading data from DRAM 2-1. Operation flow 2-2. Writing data into DRAM 2-2. Operation flow 2-3. Reading data from NAND via DRAM 2-3. Operation flow
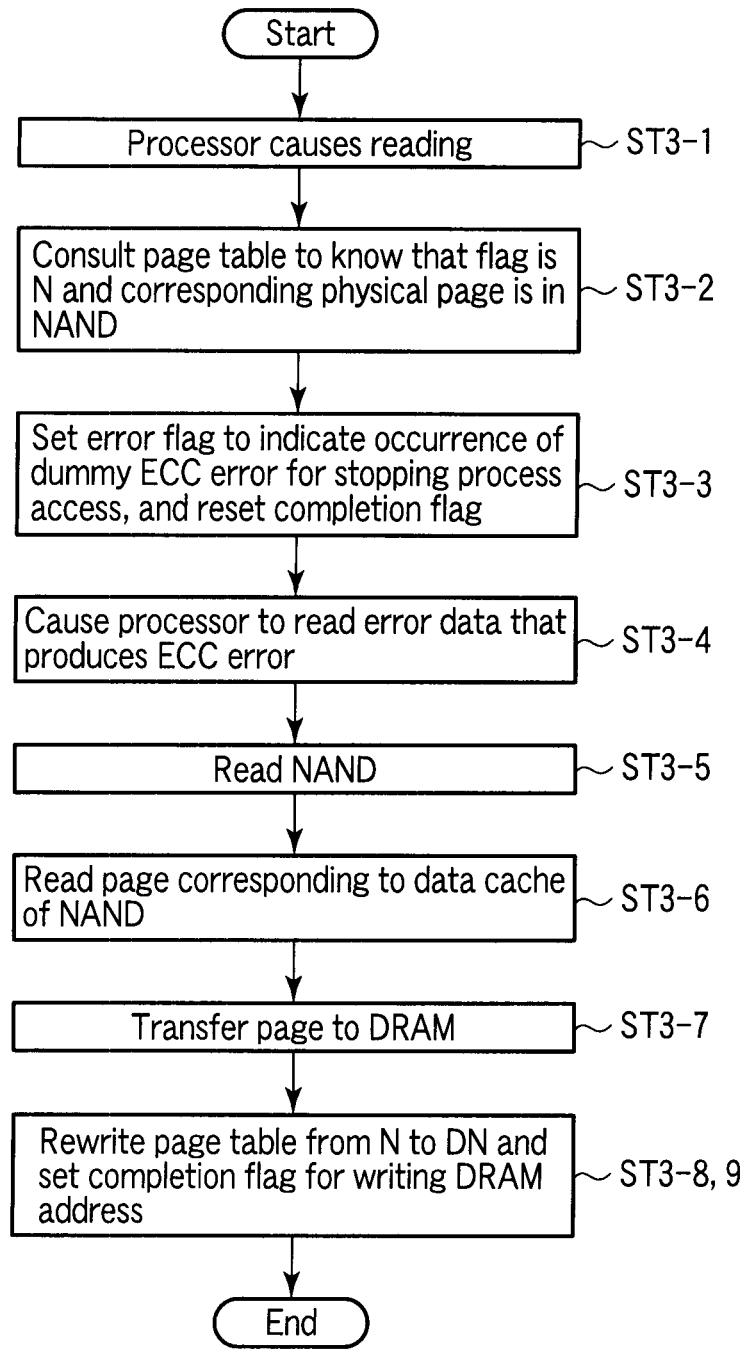
F I G. 10

2-6. Writing data into NAND 2-6. Operation flow

Second embodiment (5-1. system configuration example)
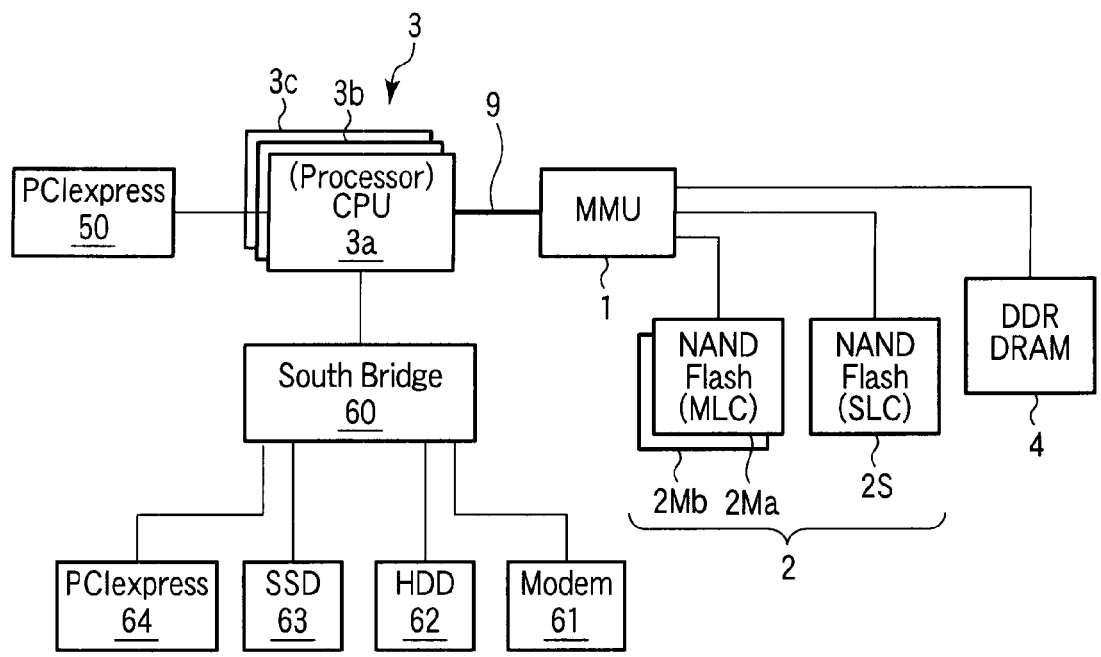
F I G. 19

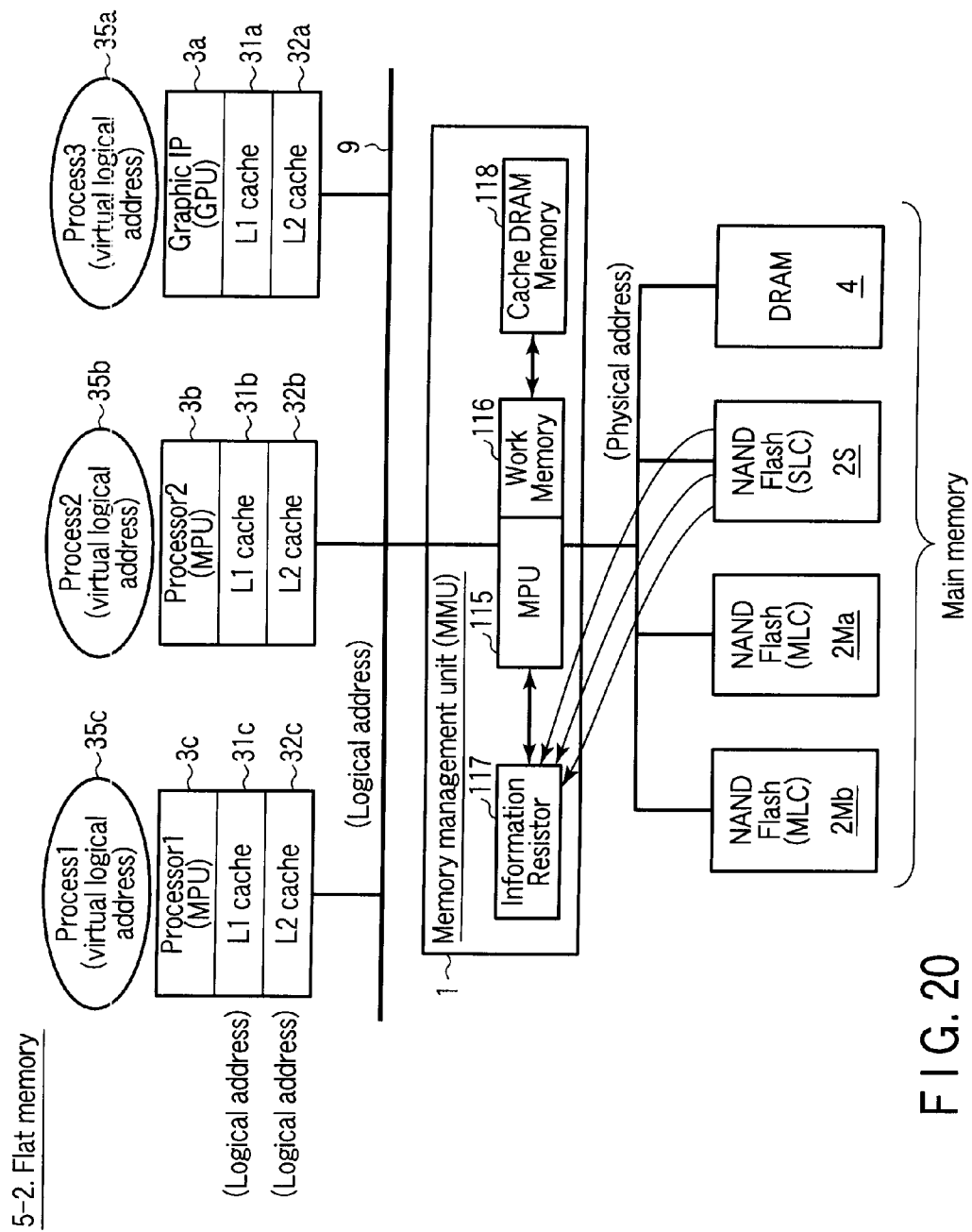
F I G. 20

5-3. Memory space of NAND (SLC)
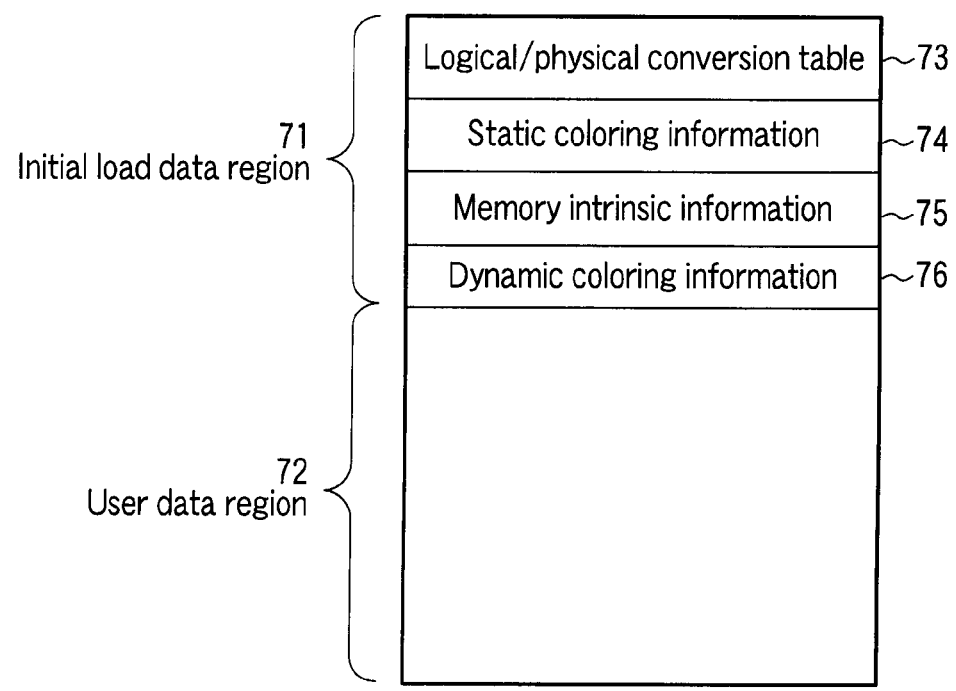
F I G. 21

Memory intrinsic information
2bit/cell

High-speed writing SLC (low read-disturb resistance)

Low-speed writing SLC (high read-disturb resistance)

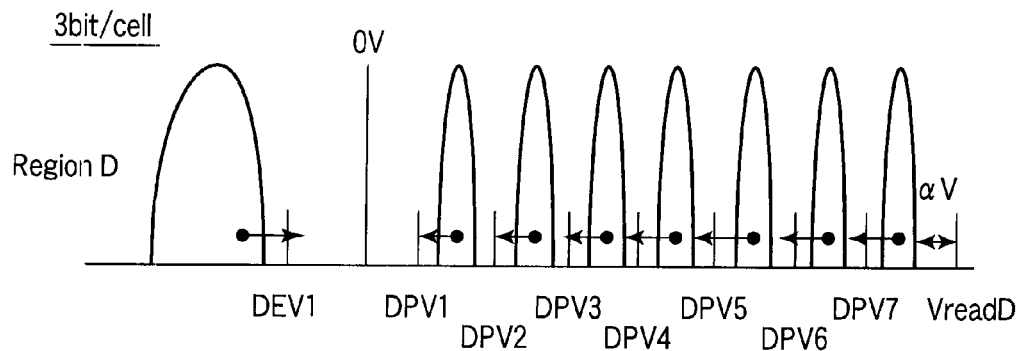
F I G. 22D
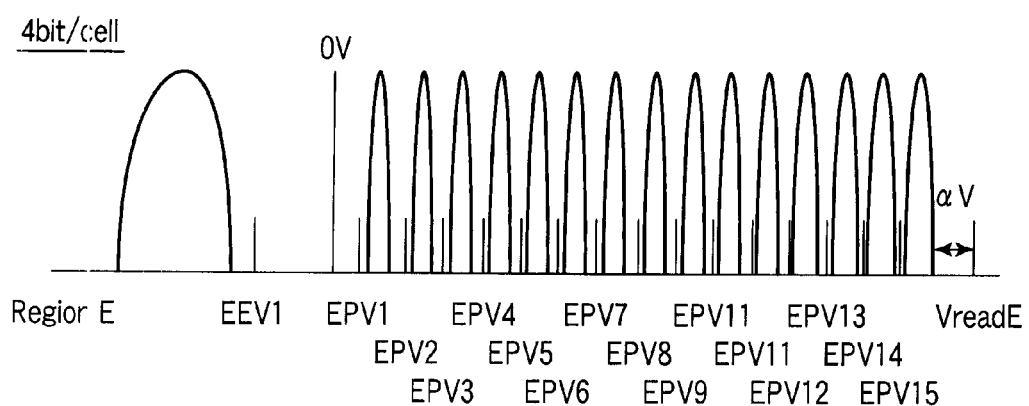
F I G. 22E 5-6. Configuration example of MMU

Reading function requests (before change)

Before change (latency)

Reading functions (after change)
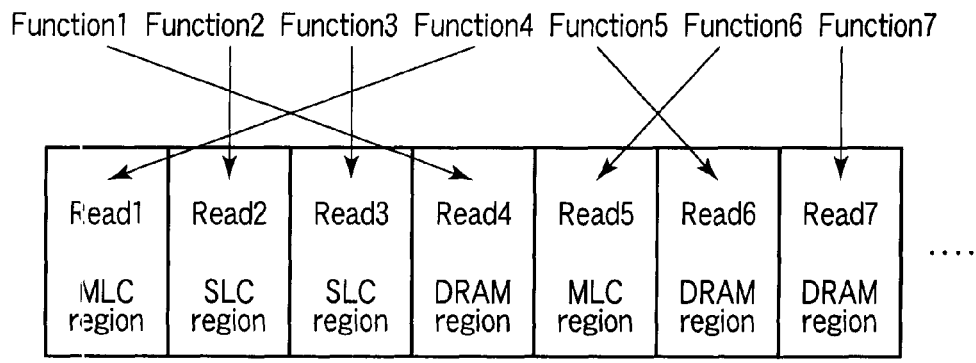
F I G. 27
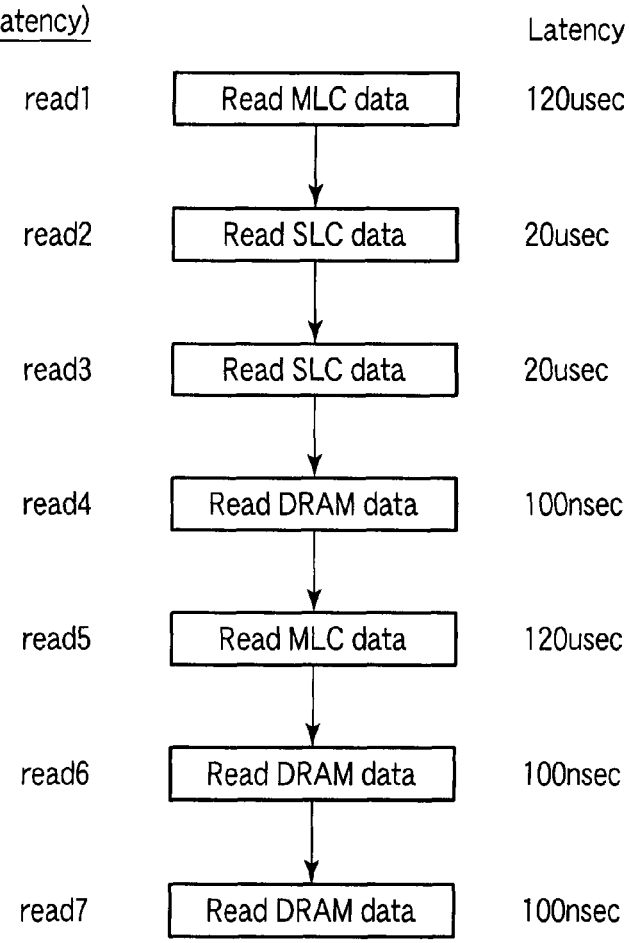
F I G. 28

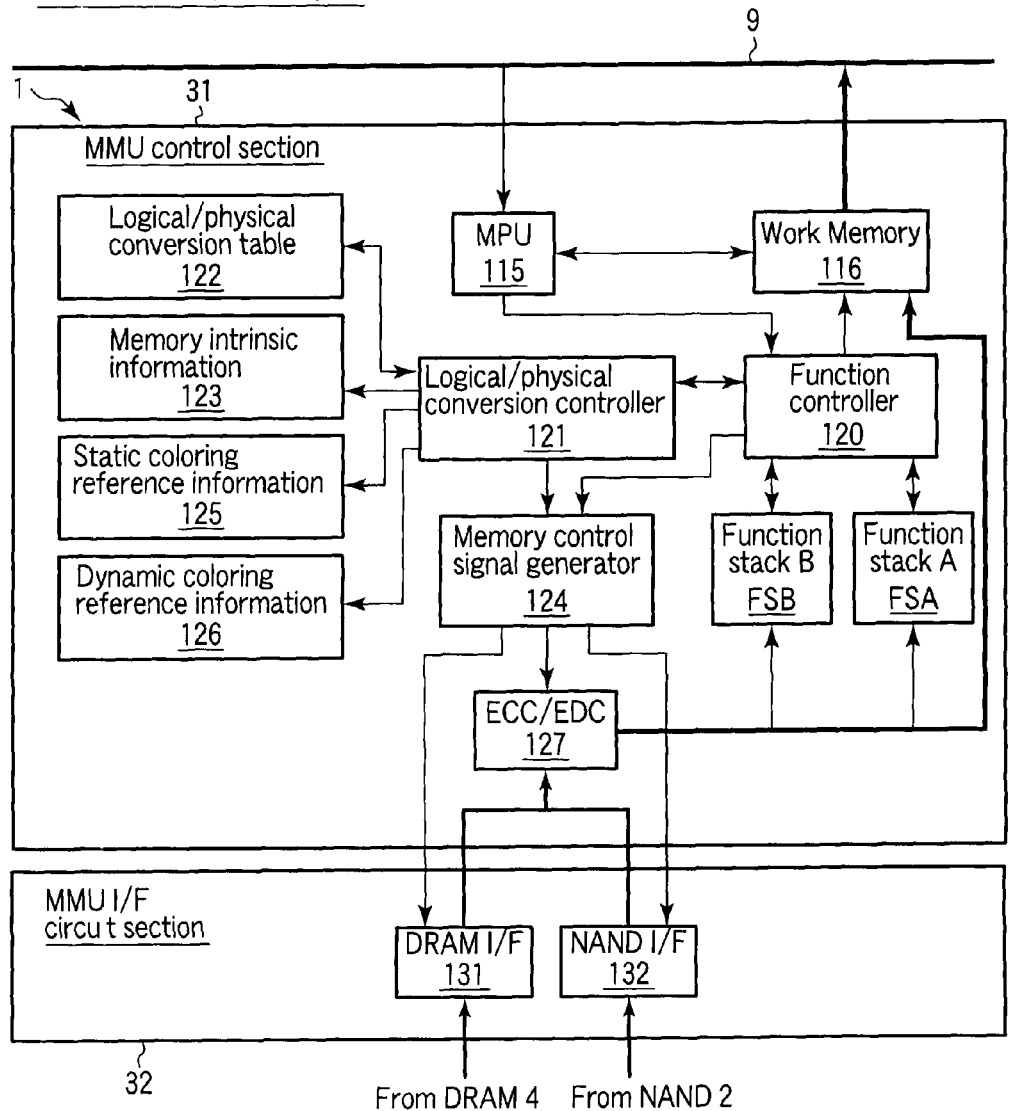
F I G. 30

MEMORY MANAGEMENT UNIT AND MEMORY MANAGEMENT METHOD FOR CONTROLLING A NONVOLATILE MEMORY AND A VOLATILE MEMORY

CROSS-REFERENCE TO RELATED APPLICATIONS

This application is based upon and claims the benefit of priority from Japanese Patent Application No. 2009-272771, filed Nov. 30, 2009; the entire contents of which are incorporated herein by reference.

FIELD

Embodiments described herein relate generally to a memory management unit and a memory management method.

BACKGROUND

A conventional micro processing unit (MPU) uses a dynamic random access memory (DRAM) as a main memory (main storage device). The conventional MPU also uses, for example, a flash memory as a secondary storage device. The conventional MPU is connected to the flash memory via an I/O interface. The flash memory is treated as a file memory by the MPU.

BRIEF DESCRIPTION OF THE DRAWINGS

FIG. 3 is a diagram showing a configuration example of a page table in FIG. 1;
FIG. 10 is a flowchart for illustrating reading of data from the NAND via the DRAM;
FIG. 19 is a block diagram showing a configuration example of a system comprising a memory management unit according to a second embodiment;
FIG. 20 is a block diagram showing a configuration example of a flat memory in FIG. 19;
FIG. 21 is a diagram showing a memory space of a NAND-type flash memory (SLC) in FIG. 20;
FIG. 22D is a diagram showing a data storage scheme (3-bit/cell) of the NAND-type flash memory;
FIG. 22E is a diagram showing a data storage scheme (4-bit/cell) of the NAND-type flash memory;
FIG. 27 is a diagram showing pre-change reading function requests;
FIG. 28 is a flowchart showing post-change latency;
FIG. 30 is a block diagram showing a memory management unit according to Modification 2.

DETAILED DESCRIPTION

Figure 1:
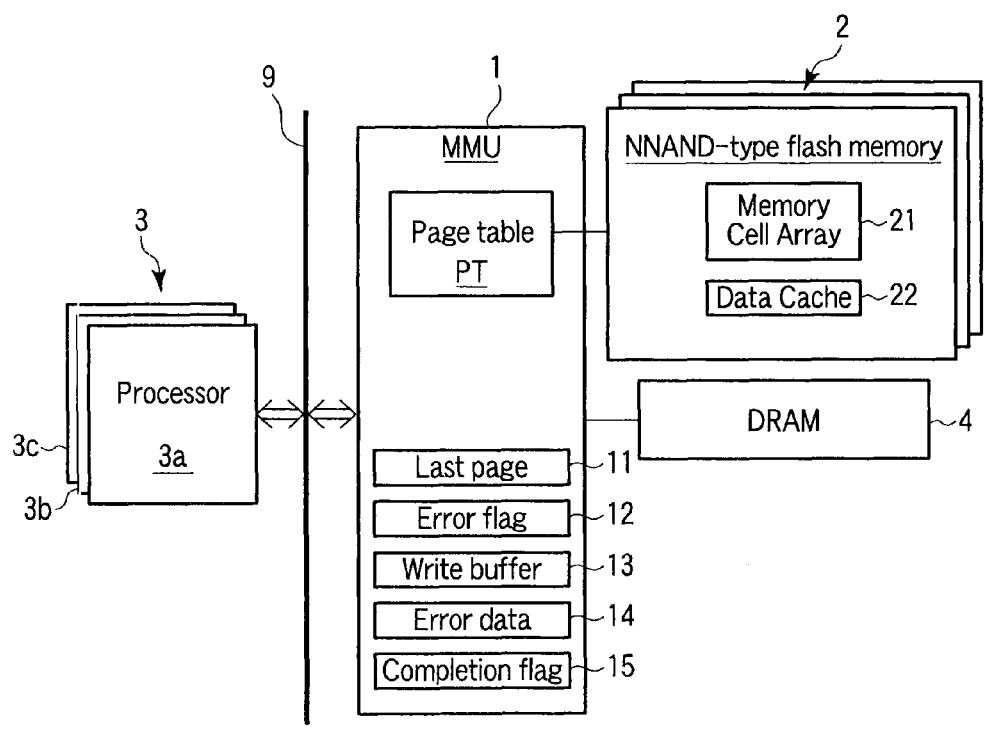
FIG. 1 is a block diagram showing a configuration example of a flat memory comprising a memory management unit according to a first embodiment.

In general, according to one embodiment, a memory management unit controls a first memory as a nonvolatile memory and a second memory as a volatile memory. The memory management unit judges whether data in the first memory desired to be accessed is stored in the second memory; setting an error flag to issue error data when the data is not stored in the second memory; reads, into a free space of the second memory, the data to be accessed in the first memory.

Here, in order for an MPU to access a file in a secondary storage device, an operating system (OS) has to perform a great amount of processing. In an information processing apparatus (computer system) saving a low storage capacity of a main memory, the lumber of accesses to a secondary storage device such as a hard disk drive (HDD) or a solid state drive (SSD) by the MPU may be increased, and the number of processes of a program may be increased, leading to a longer processing time.

One method used to solve such a problem is to prepare, in, for example, a mobile device, a DRAM having the same capacity as a NAND-type flash memory so that the entire data in the NAND-type flash memory is transferred to the DRAM at the start of operation.

However, this method requires the mounting of the expensive DRAM having the same capacity as the inexpensive NAND-type flash memory. Thus, this method is easily applied to a device having a low-capacity memory such as a mobile device, but is not easily applied to other devices having a high storage capacity.

The use of a flash memory as a main storage device of an information processing apparatus is conceivable. In this case, the flash memory is connected to a memory bus of a system via a cache memory which is a volatile memory. The cache memory is provided with an address array for recording information such as addresses and access histories of data stored in the cache memory. Referring the address to be accessed, a controller supplies the data in the cache memory or the flash memory to the memory bus, or stores data located in the memory bus.

In order to enable semiconductor memory devices of different kinds to be connected to a common bus, a random access memory chip and a package comprising the random access memory chip are included. The package has a plurality of pins for electrically connecting the random access memory chip to an external device. The pins provide a common memory function to the random access memory and an electrically erasable and programmable nonvolatile semiconductor memory. The pins are arranged at the positions of corresponding pins of the nonvolatile semiconductor memory.

However, in the above-mentioned memory, a short-access-time memory (e.g., a DRAM) and a long-access-time memory (e.g., a NAND-type flash memory) are connected to the memory bus of a processor in a mixed manner. Therefore, during, for example, reading of data from the long-access-time memory, a useless halt (idle) condition is produced in which other processes such as reading of data from the short-access-time memory cannot be performed.

Thus, the memory management unit and memory management method described above tend to produce the useless halt condition and be disadvantageous to higher efficiency in memory access.

Accordingly, the embodiment is described below with reference to the drawings. In the description, like reference signs are assigned to like parts throughout the drawings.

First Embodiment

A memory management unit and a memory management method according to a first embodiment are described with reference to FIG. 1 to FIG. 18.

1. Configuration Example 1-1. Configuration Example of Flat Memory

First, a configuration example of a semiconductor storage device (flat memory) having the memory management unit according to the first embodiment is described with reference to FIG. 1.

As shown, the semiconductor storage device comprises a memory management unit (MMU) 1, a NAND-type flash memory (nonvolatile memory) 2, a DRAM (volatile memory) 4 and a processor 3.

The memory management unit (MMU) 1 performs integrated management by treating, in the same flat memory hierarchy, memory accesses to the NAND-type flash memory 2 functioning as a main storage memory and to the DRAM 4 functioning as a cache memory of the main storage memory 2. The main storage memory (NAND-type flash memory 2) and the cache memory (DRAM 4) of the main storage memory 2 are thus treated in the same memory hierarchy so that the redundancy of processing can be prevented. For example, the memory management unit 1 can perform processing of, for example, deciding a condition of storing into the NAND-type flash memory 2 in consideration of the storing condition of the DRAM 4. Thus, the memory management unit 1 shows, to the processor 3, the NAND-type flash memory 2 and the DRAM 4 as one huge main memory in the same memory hierarchy. The memory management unit 1 also manages the NAND-type flash memory 2 and the DRAM 4 on a page-basis. This page size is more desirably adapted to the page size of the NAND-type flash memory 2 or may be a multiple of the page size of the NAND-type flash memory 2.

As described above, the semiconductor storage device according to this example manages the main storage memory (NAND-type flash memory 2) and the cache memory (DRAM 4) in the same flat memory hierarchy, and will therefore be referred to hereinafter as a flat memory.

The memory management unit (MMU) 1 comprises a page table PT, a last page 11, an error flag 12, a write buffer 13, an error data 14 and a completion flag 15.

The page table PT has, for example, a flag, a DRAM address and an NAND address, and one entry corresponds to one logical page. The configuration of the page table will be described later.

The last page 11 is data showing the address of the last page when data is read from the NAND-type flash memory 2.

The error flag 12 indicates whether an ECC error is an ECC error caused by dummy data or a true ECC error in a later-described judging operation of the memory management unit.

An address and write data are stored in the write buffer 13 in data writing.

The error data 14 is dummy data which is read into the processor to cause the later-described ECC error.

The completion flag 15 is used by the memory management unit 1 to indicate to the processor 3 (OS) that data on the NAND-type flash memory 2 has been read and transferred to the cache memory (DRAM). The details will be described later.

The NAND-type flash memory 2 functions as the main storage memory for storing data in a nonvolatile manner. The NAND-type flash memory 2 comprises a memory cell array 21 and a data cache 22. The memory cell array 21 has a plane composed of a plurality of clocks. The details will be described later. The NAND-type flash memory 2 may comprise a plurality of NAND-type flash memories (2a to 2c) including a binary memory (SLC: single level cell) and a multilevel memory (MLC: multilevel cell).

The DRAM 4 stores data in a volatile manner, and functions as the cache memory of the main storage memory (NAND-type flash memory 2).

The processor 3 controls the memory management unit 1 via a memory bus 9. In this example, the processor 3 has a multiprocessor configuration including a plurality of processors (3a to 3c). However, the processor 3 is not limited thereto, and can be a single processor.

1-2. Configuration Example of Block

Figure 2:
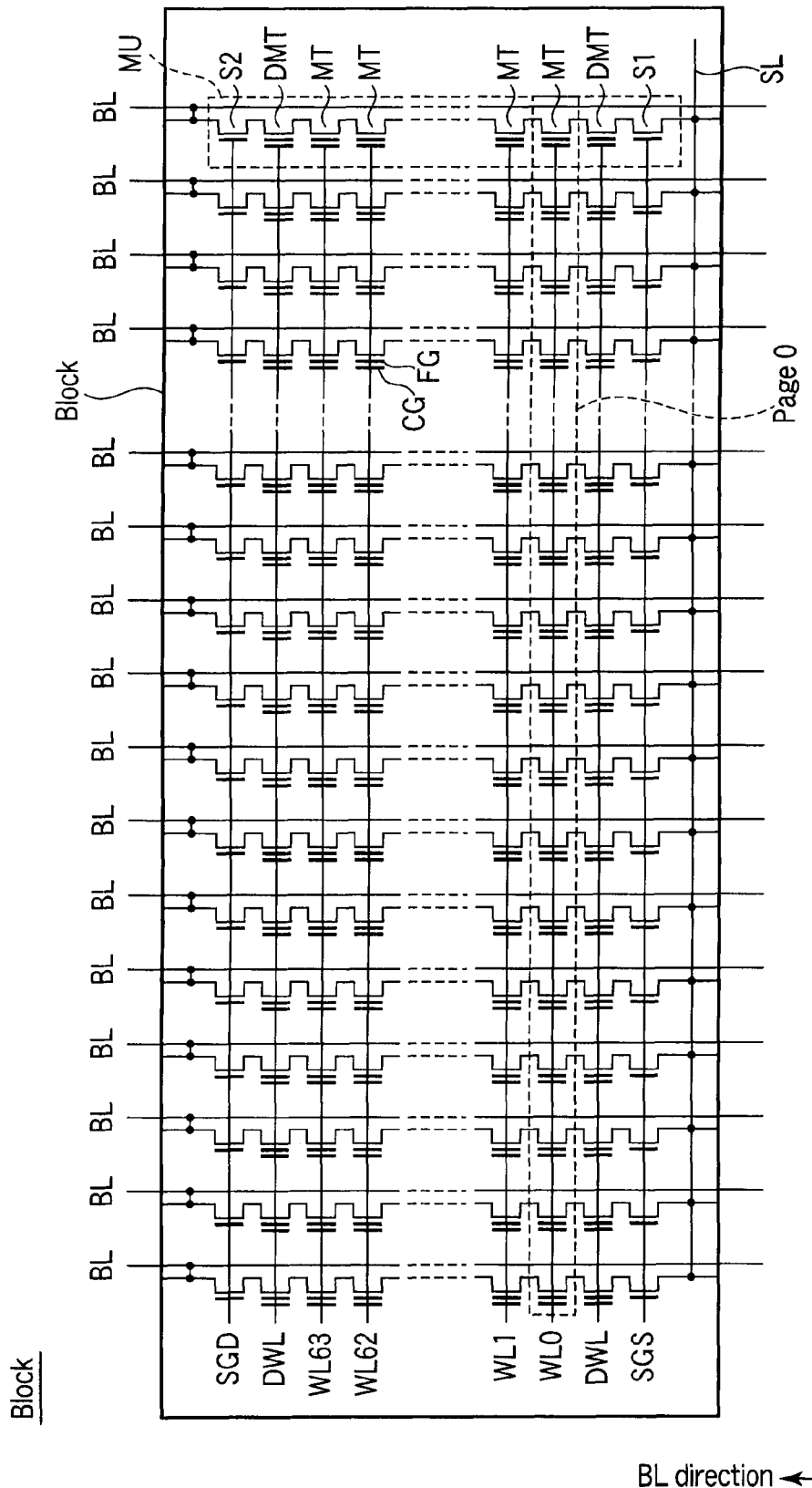
FIG. 2 is an equivalent circuit diagram showing a block that constitutes a NAND-type flash memory in FIG. 1.

Now, a configuration example of a block provided in the NAND-type flash memory is described with reference to FIG. 2.

As shown, one block Block is described here by way of example. Memory cell transistors MT in this block Block are collectively erased. That is, the block is an erasing unit.

As shown, the block Block comprises a plurality of memory cell lines (memory cell units) MU arranged in a word line direction (WL direction). The memory cell line MU comprises a NAND string to which a current path is directly connected and which includes 64 memory cell transistors MT and two dummy cells DMT, a select transistor S1 connected to one end of the NAND string, and a select transistor S2 connected to the other end of the NAND string. Although the NAND string comprises 64 memory cells MT in this example, the NAND string has only to comprise two or more memory cells and is not particularly limited to the above number of memory cells.

The other end of the current path of the select transistor S2 is connected to a bit line BL, and the other end of the current path of the select transistor S1 is connected to a source line SL.

Word lines WL0 to WL63 and a dummy word line DWL extend in the WL direction, and are connected, in a shared manner, to a plurality of memory cell transistors MT and dummy cells DMT in the WL direction. A select gate line SGD extends in the WL direction, and is connected, in a shared manner, to a plurality of select transistors S2 in the WL direction. A select gate line SGS also extends in the WL direction, and is connected, in a shared manner, to a plurality of select transistors S1 in the WL direction.

A unit called a page is configured for each of the word lines WL0 to WL63. For example, as indicated by an encircling broken line in the diagram, one page (page 0) is allocated to the word line WL0. As a reading operation and writing operation are performed page by page, the page is a reading unit and a writing unit. In the case of a multilevel memory cell capable of retaining a plurality of bits of data in one memory cell, a plurality of pages are allocated to one word line.

The memory cell MT is provided at the intersection of the bit line BL and the word line WL. The memory cell MT has a stack structure in which a tunnel insulating film, a floating electrode FG as a charge accumulation layer, an inter-gate insulating film and a control electrode CG are provided in order on a semiconductor substrate. A source/drain which is a current path of the memory cell MT is connected in series to the source/drain of the adjacent memory cell MT. One end of the current path is connected to the bit line BL via the select transistor S2, and the other end of the current path is connected to the source line SL via the select transistor S1. Each of the memory cells MT comprises a source/drain provided in the semiconductor substrate (Si substrate (Si-sub) or P-well) to sandwich a spacer provided along the sidewall of the stack structure and also sandwich the stack structure.

The select transistor S1, S2 comprises a gate insulating film, an inter-gate insulating film and a gate electrode. The center of the inter-gate insulating film of the select transistor S1, S2 is divided into upper and lower layers so that these layers are electrically connected to each other. The select transistor S1, S2 also comprises a spacer provided along the sidewall of the gate electrode, and a source/drain provided in the semiconductor substrate to sandwich the gate electrode.

1-3. Configuration Example of Page Table

Now, a configuration example of the page table provided in the memory management unit according to the first embodiment is described with reference to FIG. 3.

As shown, the page table PT according to this example includes a flag, a DRAM address and a NAND address.

The flag indicates the kind of a physical page corresponding to a relevant logical page.

A flag "E" indicates non-use (no allocated physical page). A flag "D" indicates that the page is on the DRAM (e.g., a DRAM address D1). A flag "N" indicates that the page is on the NAND (e.g., a NAND address N1). A flag "DN" indicates that a page on the NAND (e.g., a NAND address N2) is being cached in the DRAM (e.g., a DRAM address D2). A flag "DW" indicates that the data on the DRAM (e.g., a DRAM address D3) cached from the NAND has been rewritten.

As described above, a corresponding address (D1 to D3) on the DRAM is stored in the DRAM address when the flag is "D", "DN" or "DW".

A corresponding address (N1, N2) on the NAND is stored in the NAND address when the flag is "D" or "DN".

In the configuration of the page table according to the present embodiment, the sections of the DRAM address and the NAND address are not used in many cases and are therefore redundant. The page table PT may be provided in a dedicated memory in the memory management uiit (MMU) 1. The page table PT may otherwise be provided in part of the DRAM 4 connected to the memory management unit (MMU) 1. In addition, the page table PT may have a multistage configuration similarly to a page table of a general virtual storage. This is advantageous in that the necessary memory capacity can be reduced.

2. Memory Management Operation

Now, a memory management operation of the memory management unit according to the first embodiment is described with reference to FIG. 4 to FIG. 16.

2-0. Judging Whether Data to be Accessed by the Processor is on the DRAM

Figure 4:
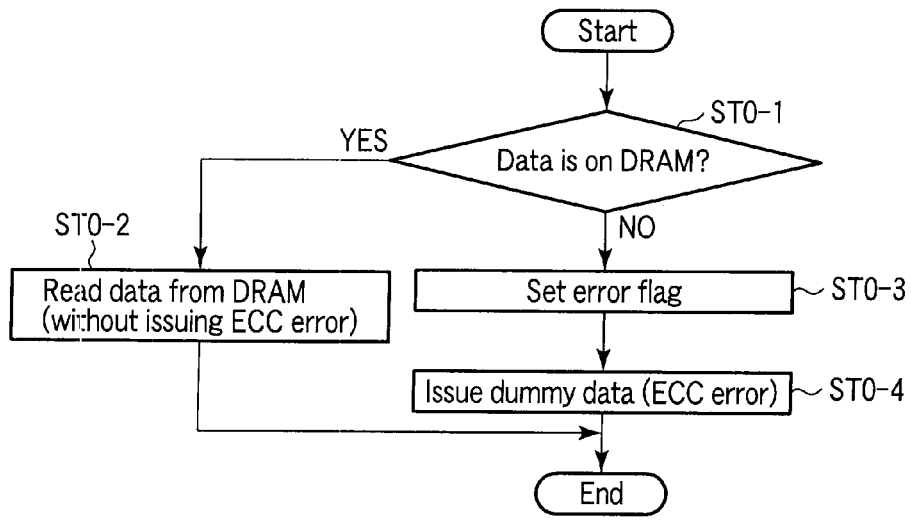
FIG. 4 is a flowchart showing a judging operation of the memory management unit.

First, the operation performed by the memory management unit (MMU) 1 for judging whether data is on the DRAM 4 is described with reference to FIG. 4.

(ST0-1)

As shown, the memory management unit 1 first judges whether data to be accessed by the processor 3 is on the DRAM 4.

Accordingly, when data to be accessed by the processor 3 is stored in the DRAM 4, the data can be accessed rapidly.

However, when the data is stored in the NAND-type flash memory 2, the data read from the memory cell array 21 has to be copied to the data cache 22, and the time of accessing to this data therefore increases. Thus, in this step ST0-1, whether the data to be accessed by the processor 3 is stored in the DRAM 4 or the NAND-type flash memory 2 is judged.

(ST0-2)

Furthermore, when it is found out in step ST0-1 that the data to be accessed by the processor 3 is stored in the DRAM 4 (Yes), the memory management unit 1 reads the data from the DRAM 4 by normal control (without issuing any ECC error in the following step ST0-3).

(ST0-3)

Furthermore, when the data to be accessed by the processor 3 is not stored in the DRAM 4 in step ST0-1 (No), the memory management unit 1 judges that the data is stored in the NAND-type flash memory 2, and sets the error flag 12.

(ST0-4)

The memory management unit 1 then issues the dummy data (ECC error) 14 to the processor 3.

Moreover, the processor 3 which has read the dummy data (ECC error) 14 refers the error flag 12, and judges whether the ECC error is a (non-dummy) true ECC error. The processor 3 then brings Process 1 (e.g., a process that requires the data on the NAND-type flash memory 2) into a waiting condition (WAIT), and switches to and runs Process 2 (RUNNABL) (e.g., a process that does not require the data on the NAND-type flash memory 2) which is redundantly runnable while the data on the NAND-type flash memory 2 is being read. The details will be described later.

Various operations for the NAND-type flash memory 2 and the DRAM 4 after the above-mentioned judging operation are described below in detail in 2-1 to 2-6.

2-1. Reading Data from the DRAM

Figure 5:
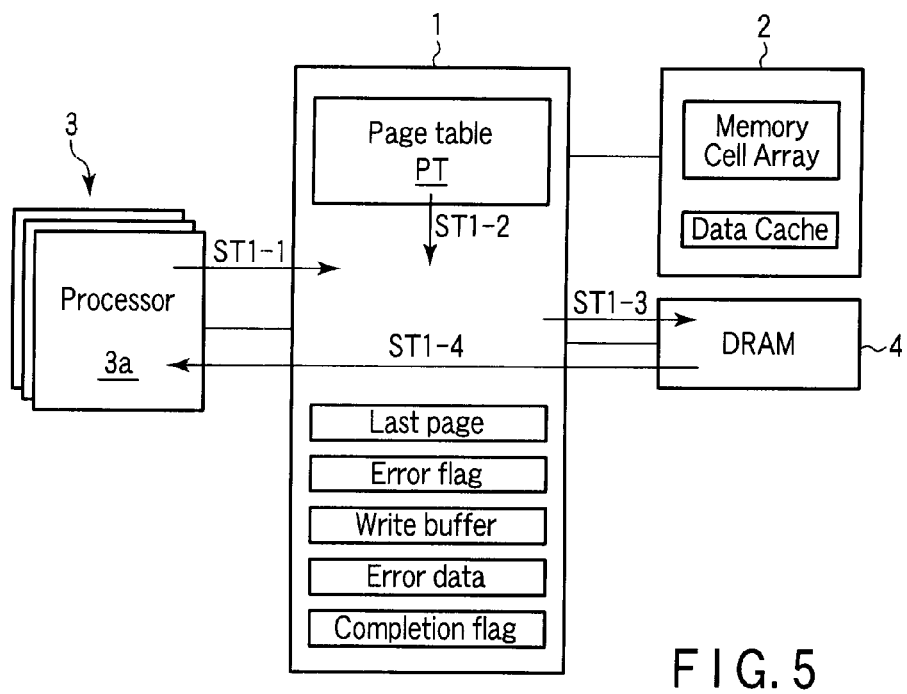
FIG. 5 is a block diagram for illustrating reading of data from a DRAM.
Figure 6:
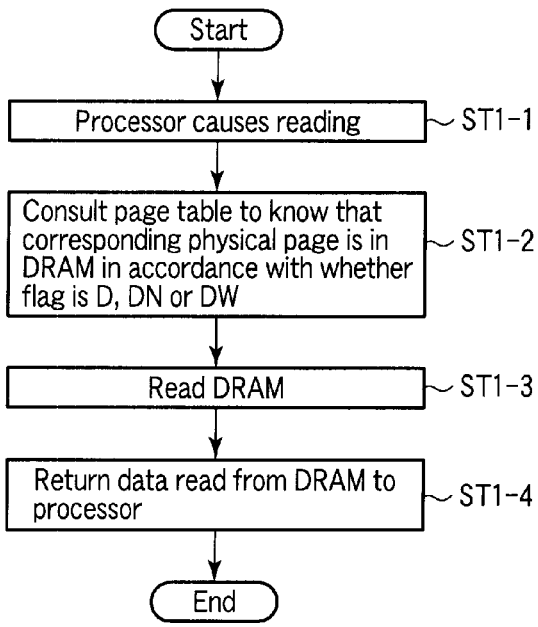
FIG. 6 is a flowchart for illustrating reading of data from the DRAM.

First, a data reading operation performed by the memory management unit (MMU) 1 to read data from the DRAM 4 is described with reference to FIG. 5 and FIG. 6. This operation is performed when it is judged in step ST0-1 of the above-mentioned judging operation that the data to be accessed by the processor 3 is stored in the DRAM 4 (Yes).

(ST1-1)

As shown, the memory management unit 1 receives a command (READ) issued by the processor 3 to read data from the DRAM 4.

(ST1-2)

In response to the READ, the memory management unit 1 then checks the page table PT. When the page table PT is checked, whether the flag is "D", "DN" or "DW" as described above can be judged to find out that the corresponding physical page is on the DRAM 4.

(ST1-3)

The memory management unit 1 then reads the data from the DRAM 4 (READ).

(ST1-4)

The memory management unit 1 then transfers the data read from the DRAM 4 to the processor 3.

2-2. Writing Data Into the DRAM

Figure 7:
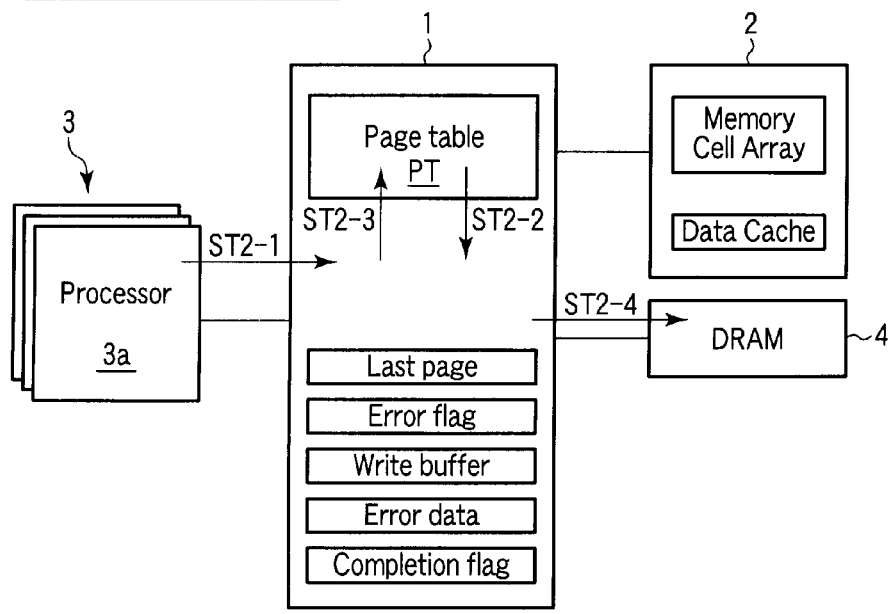
FIG. 7 is a block diagram for illustrating writing of data into the DRAM.
Figure 8:
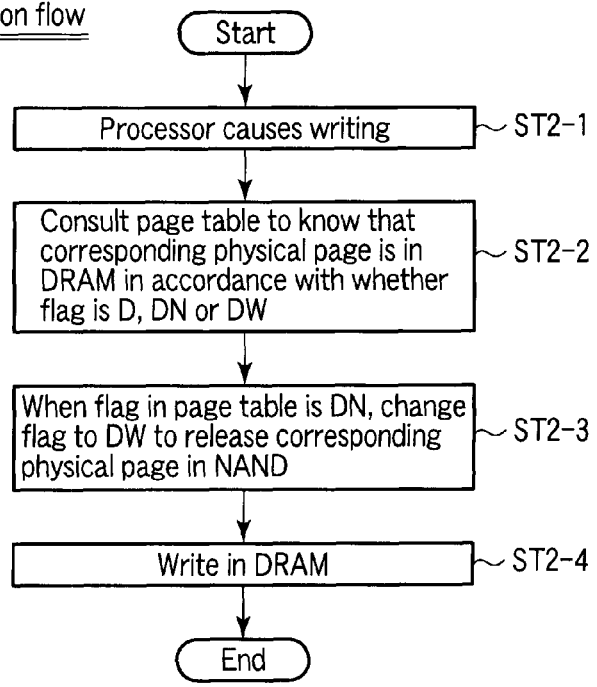
FIG. 8 is a flowchart for illustrating writing of data into the DRAM.

Now, a data writing operation performed by the memory management unit (MMU) 1 to write data into the DRAM 4 is described with reference to FIG. 7 and FIG. 8. This operation is performed when it is judged in step ST0-1 of the above-mentioned judging operation that the data to be accessed by the processor 3 is stored in the DRAM 4 (Yes).

(ST2-1)

As shown, the memory management unit 1 receives a command (WRITE) issued by the processor 3 to write data into the DRAM 4.

(ST2-2)

In response to the WRITE, the memory management unit 1 then checks the page table PT. When the page table PT is checked, whether the flag is "D", "DN" or "DW" can be judged to find out that the corresponding physical page is on the DRAM 4.

(ST2-3)

Furthermore, when the flag is "DN", the memory management unit 1 changes the flag to "DW", and releases the corresponding physical page in the NAND-type flash memory 2.

(ST2-4)

The memory management unit 1 then writes corresponding data into the DRAM 4.

2-3. Reading Data from the NAND Via the DRAM

Figure 9:
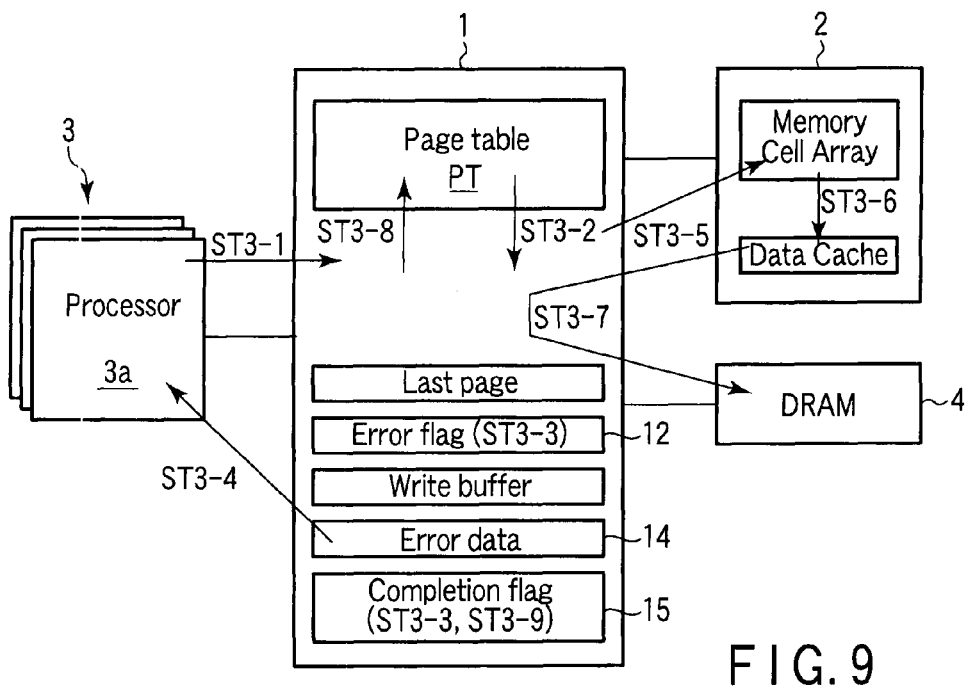
FIG. 9 is a block diagram for illustrating reading of data from the NAND via the DRAM.

Now, an operation performed by the memory management unit (MMU) 1 to read data from the NAND-type flash memory 2 via the DRAM 4 (by caching the data in the DRAM) is described with reference to FIG. 9 and FIG. 10. This operation is performed when it is judged in step ST0-1 of the above-mentioned judging operation that the data to be accessed by the processor 3 is stored on the NAND-type flash memory 2 (No).

(ST3-1)

As shown, the memory management unit 1 receives a command (READ) issued by the processor 3 to read data from the NAND-type flash memory 2.

(ST3-2)

In response to the READ, the memory management unit 1 then checks the page table PT. When the page table PT is checked, whether the flag is "N" can be judged to find out that the corresponding physical page is on the NAND-type flash memory 2.

(ST3-3)

The memory management unit 1 then sets the error flag 12 to indicate the occurrence of a dummy ECC error for stopping the access by the processor 3. The memory management unit 1 then resets the completion flag 15.

(ST3-4)

The memory management unit 1 then causes the processor 3 to read the error data 14 that causes the ECC error.

(ST3-5)

The memory management unit 1 then reads, from the memory cell array 21, data relevant to the read request of the processor 3 stored in the NAND-type flash memory 2.

(ST3-6)

The memory management unit 1 then reads, into the data cache 22, the page data read from the memory cell array 21 of the NAND-type flash memory 2.

(ST3-7)

The memory management unit 1 then transfers, to the DRAM 4, the page data stored in the data cache 22.

(ST3-8, ST3-9)

The memory management unit 1 then rewrites the flag "N" in the page table PT into the flag "DN", and writes the address of the DRAM 4.

The memory management unit 1 then sets the completion flag 15.

2-4. Reading Data from the NAND (Without Preceding Access to the NAND)

Figure 11:
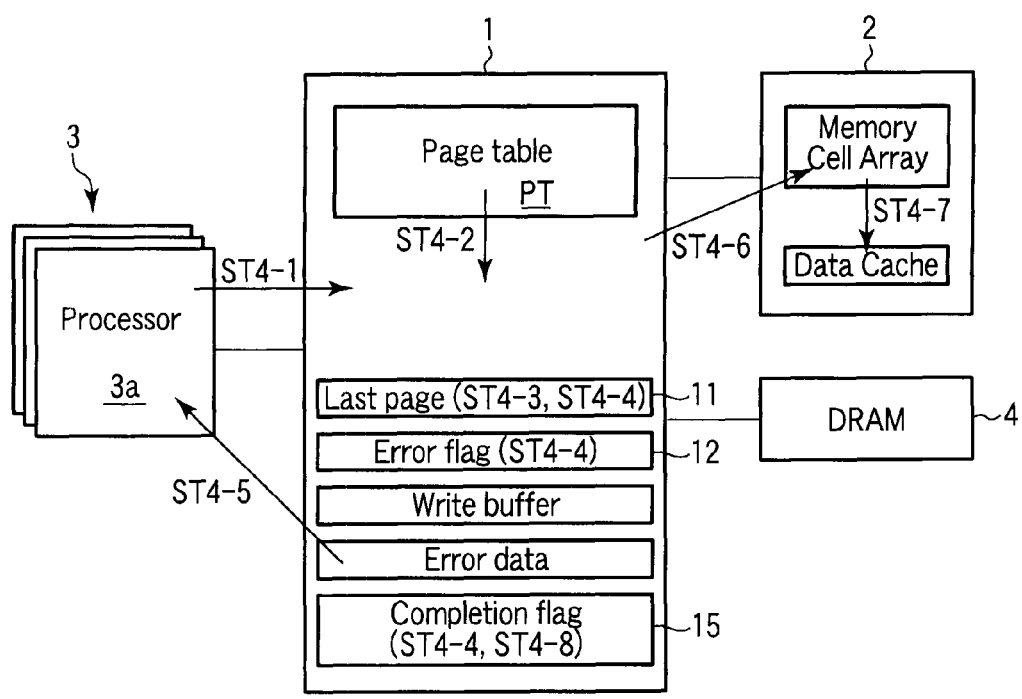
FIG. 11 is a block diagram for illustrating reading of data from the NAND (without preceding access to the NAND)
Figure 12:
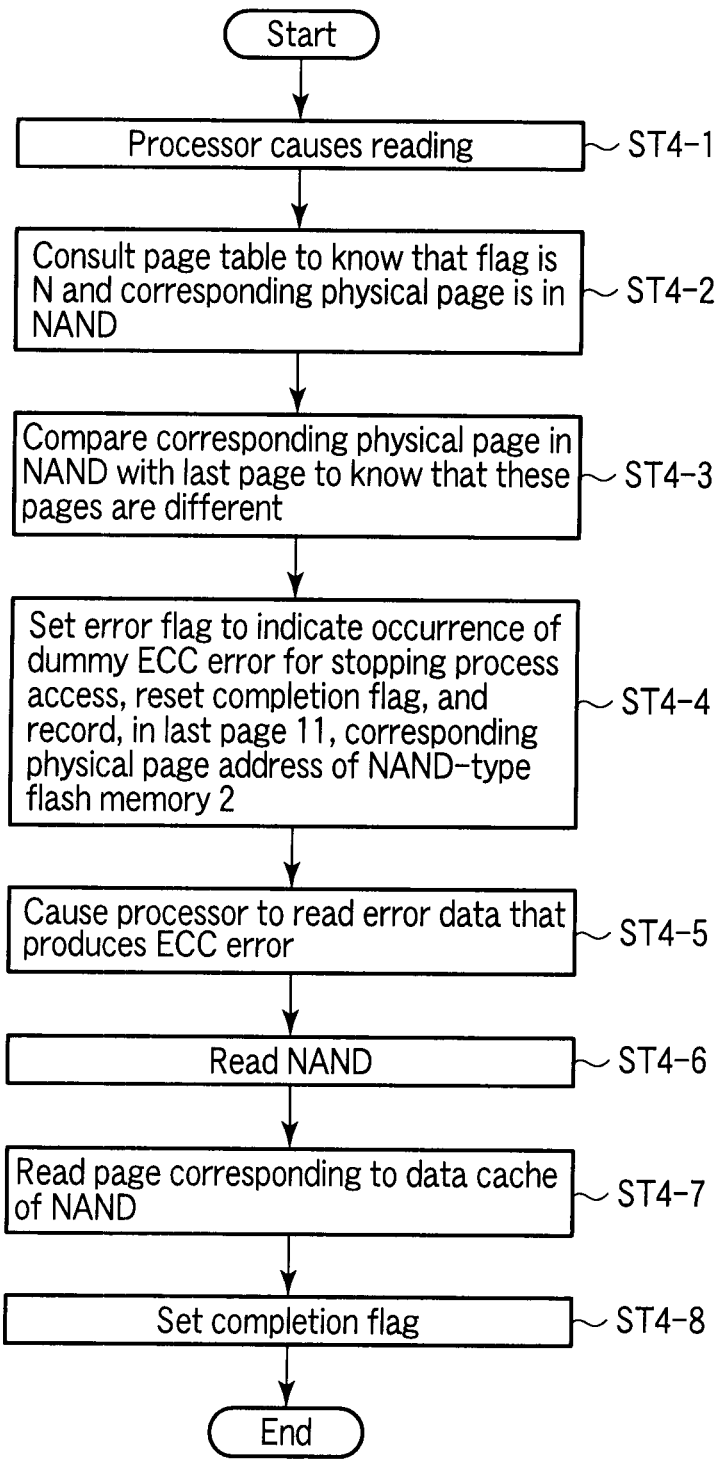
FIG. 12 is a flowchart for illustrating reading of data from the NAND (without preceding access to the NAND)

Now, an operation performed by the memory management unit (MMU) 1 to read data from the NAND-type flash memory 2 (without preceding access to the NAND) is described with reference to FIG. 11 and FIG. 12. This operation is performed when it is judged in step ST0-1 of the above-mentioned judging operation that the data to be accessed by the processor 3 is stored on the NAND-type flash memory 2 (No).

(ST4-1)

As shown, the memory management unit 1 receives a command (READ) issued by the processor 3 to read data from the NAND-type flash memory 2.

(ST4-2)

In response to the READ, the memory management unit 1 then checks the page table PT. When the page table PT is checked, whether the flag is "N" as described above can be judged to find out that the corresponding physical page is on the NAND-type flash memory 2.

(ST4-3)

The memory management unit 1 then compares the address of the corresponding physical page in the NAND-type flash memory 2 with the last page 11. When this address is different from the last page 11, the memory management unit 1 ascertains that there has been no preceding access to the NAND-type flash memory 2.

(ST4-4)

The memory management unit 1 then sets the error flag 12 to indicate the occurrence of a dummy ECC error for stopping the access by the processor 3. The memory management unit 1 then resets the completion flag 15, and records, in the last page 11, the address of the corresponding physical page in the NAND-type flash memory 2.

(ST4-5)

The memory management unit 1 then causes the processor 3 to read the error data 14 that causes the ECC error.

(ST4-6)

The memory management unit 1 then reads, from the memory cell array 21, data relevant to the read request of the processor 3 stored in the NAND-type flash memory 2.

(ST4-7)

The memory management unit 1 then reads, into the data cache 22, the page data read from the memory cell array 21 of the NAND-type flash memory 2.

(ST4-8)

The memory management unit 1 then sets the completion flag 15.

2-5. Reading Data from the NAND (with Preceding Access to the NAND)

Figure 13:
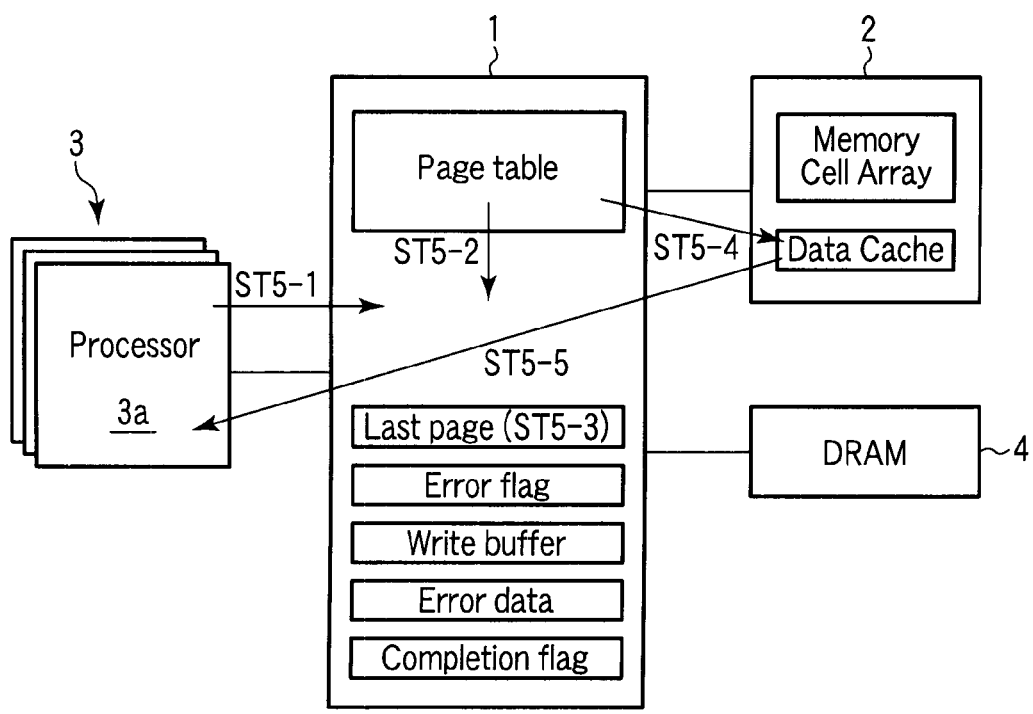
FIG. 13 is a block diagram for illustrating reading of data from the NAND (with preceding access to the NAND)
Figure 14:
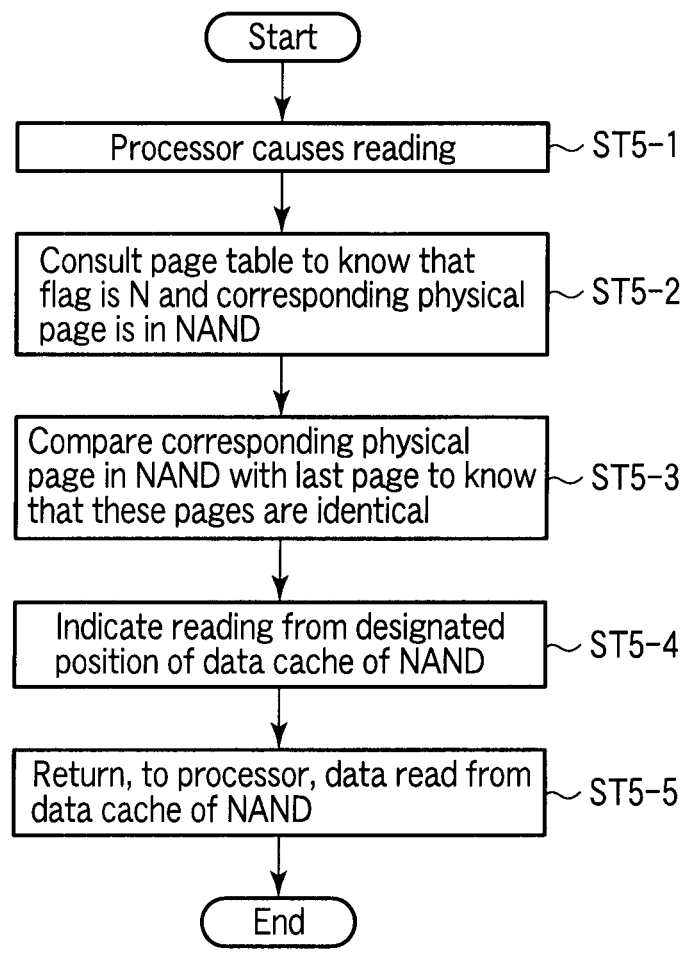
FIG. 14 is a flowchart for illustrating reading of data from the NAND (with preceding access to the NAND)

Now, an operation performed by the memory management unit (MMU) 1 to read data from the NAND-type flash memory 2 (with preceding access to the NAND-type flash memory 2) is described with reference to FIG. 13 and FIG. 14. This operation is performed when it is judged in step ST0-1 of the above-mentioned judging operation that the data to be accessed by the processor 3 is stored on the NAND-type flash memory 2 (No).

(ST5-1)

As shown, the memory management unit 1 receives a command (READ) issued by the processor 3 to read data from the NAND-type flash memory 2.

(ST5-2)

In response to the READ, the memory management unit 1 then checks the page table PT. When the page table PT is checked, whether the flag is "N" as described above can be judged to find out that the corresponding physical page is on the NAND-type flash memory 2.

(ST5-3)

The memory management unit 1 then compares the address of the corresponding physical page in the NAND-type flash memory 2 with the last page 11. When this address is the same as the last page 11, the memory management unit 1 ascertains that there has been preceding access to the same page in the NAND-type flash memory 2.

(ST5-4)

The memory management unit 1 then indicates reading of data from a designated position of the data cache 22 of the NAND-type flash memory 2.

(ST5-5)

The memory management unit 1 then transfers, to the processor 3, the data read from the data cache 22 of the NAND-type flash memory 2.

2-6. Writing Data into the NAND

Figure 15:
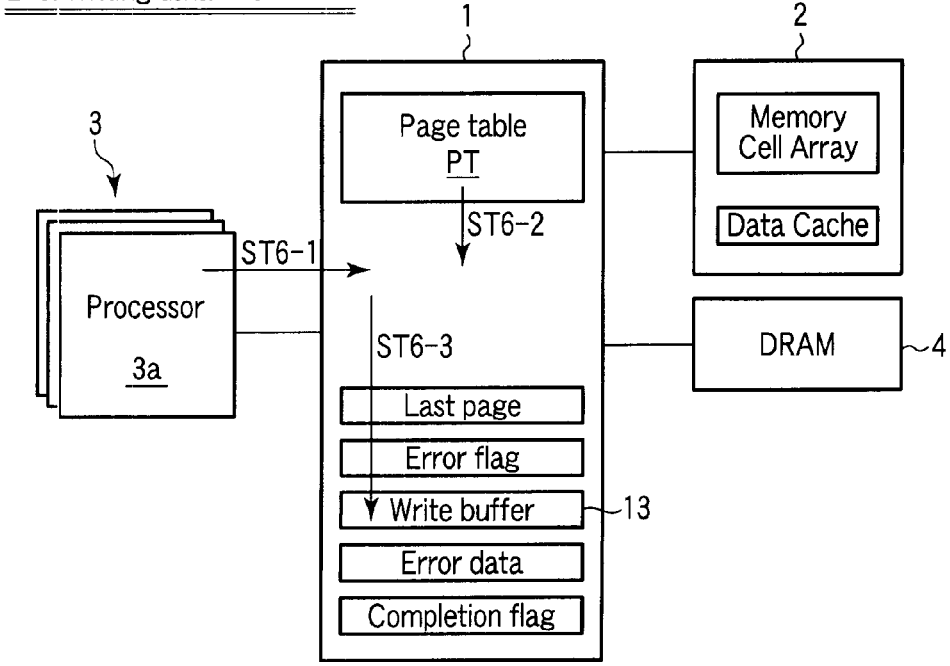
FIG. 15 is a block diagram for illustrating writing of data into the NAND.
Figure 16:
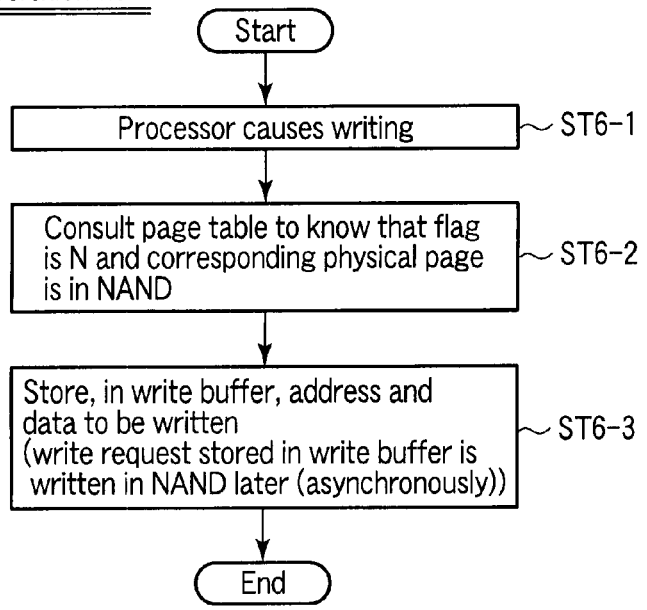
FIG. 16 is a flowchart for illustrating writing of data into the NAND.

Now, an operation performed by the memory management unit (MMU) 1 to write data into the NAND-type flash memory 2 is described with reference to FIG. 15 and FIG. 16. This operation is performed when it is judged in step ST0-1 of the above-mentioned judging operation that the data to be accessed by the processor 3 is stored on the NAND-type flash memory 2 (No).

(ST6-1)

As shown, the memory management unit 1 receives a command (WRITE) issued by the processor 3 to write data into the NAND-type flash memory 2.

(ST6-2)

In response to the WRITE, the memory management unit 1 then checks the page table PT. When the page table PT is checked, whether the flag is "N" as described above can be judged to find out that the corresponding physical page is on the NAND-type flash memory 2.

(ST6-3)

The memory management unit 1 then stores, in the write buffer 13, the address and data to be written. The write request stored in the write buffer 13 is written into the NAND-type flash memory 2 later (asynchronously).

3. Operation of the Processor and the Entire Flat Memory

Figure 17:
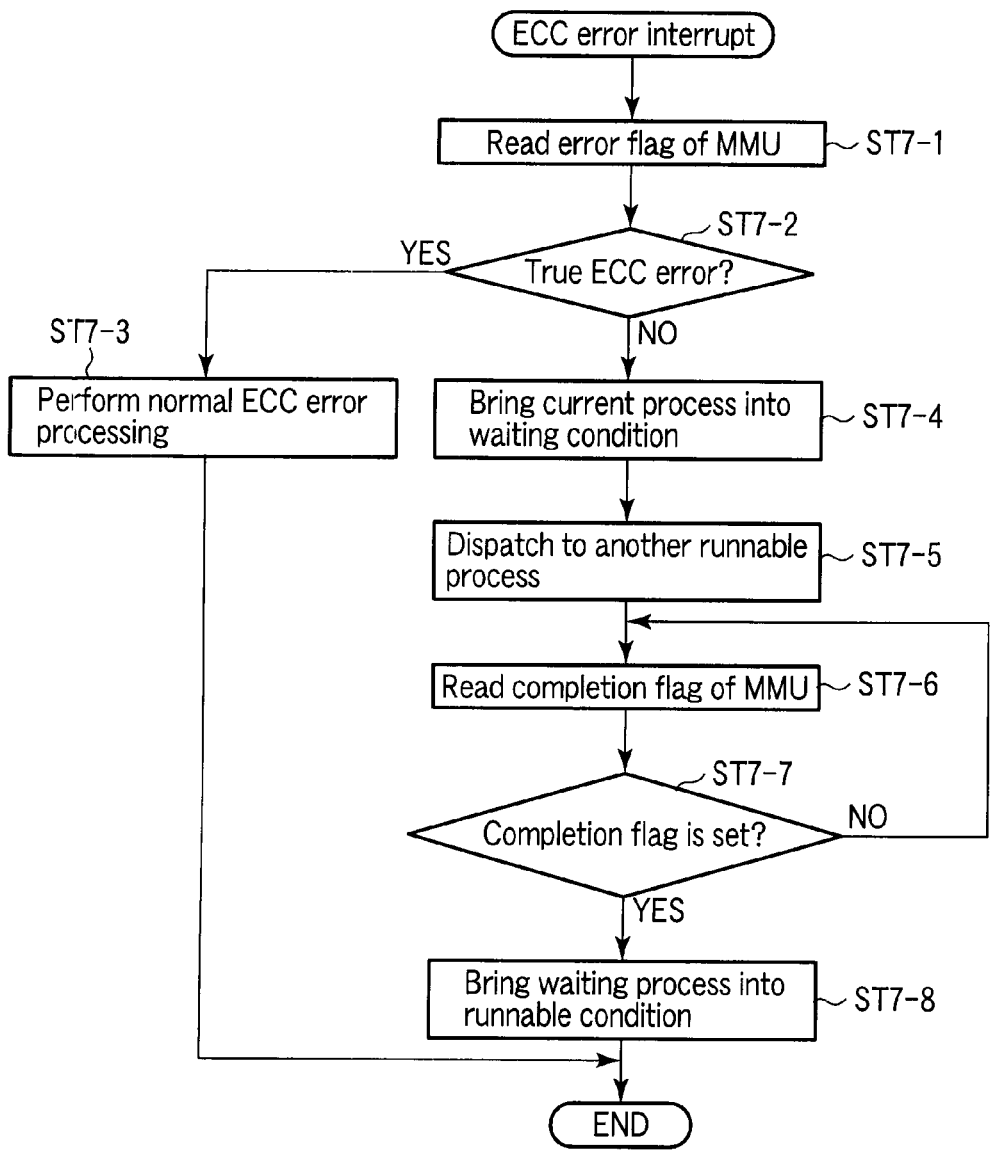
FIG. 17 is a flowchart showing processor-side detection of an error flag from the MMU.
Figure 18:
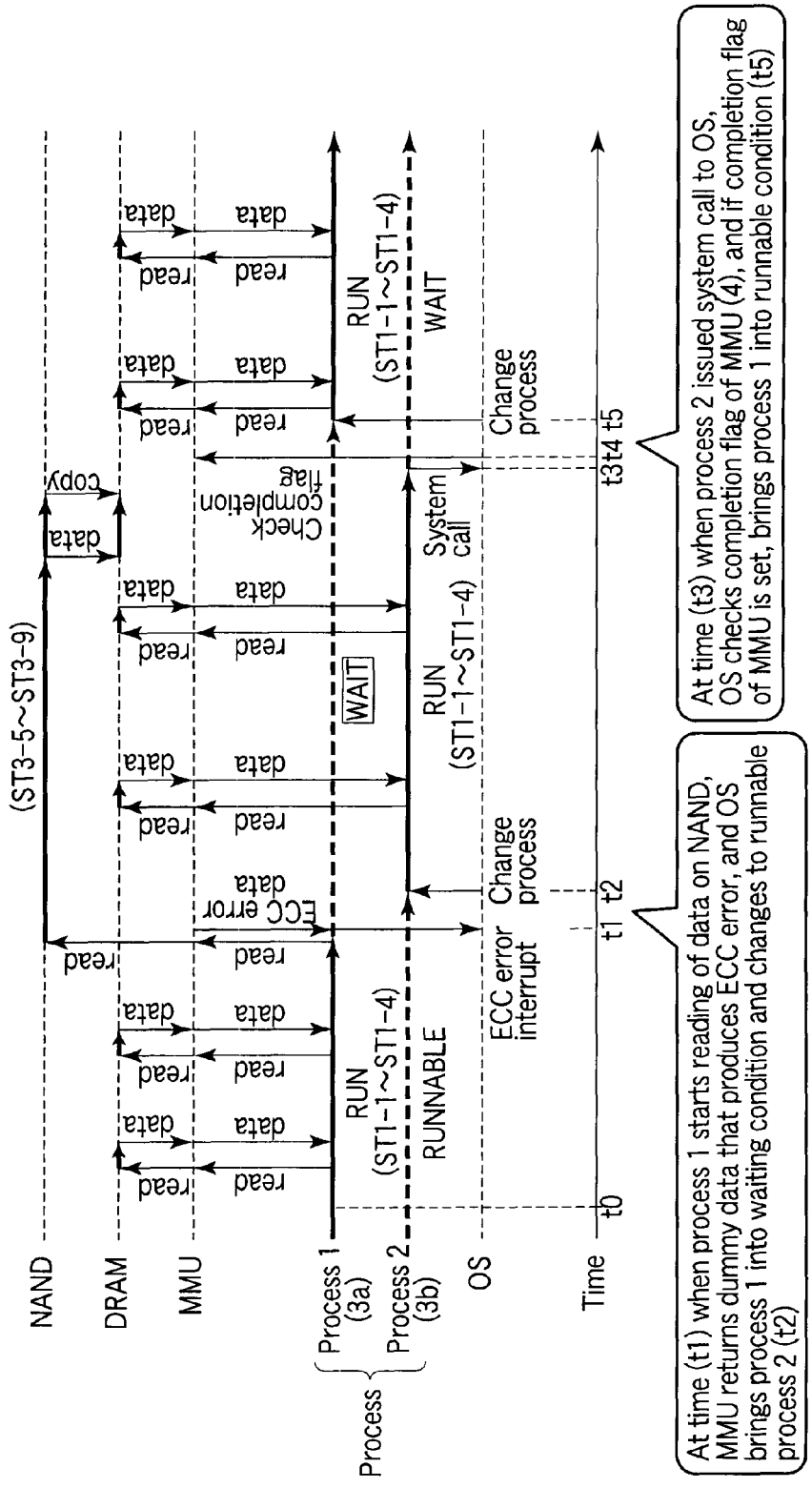
FIG. 18 is a timing chart showing an operation in the case where an untrue ECC error is detected (in the case where reading/writing is performed on the NAND)

Now, the operation of the processor 3 and the entire flat memory is described with reference to FIG. 17 and FIG. 18.

3-1. Detection, by the Processor 3, of an Error Flag Sent from the Memory Management Unit 1

First, the operation of the processor 3 is described with reference to FIG. 17.

(ST7-1)

As shown, on receipt of an ECC error interrupt, the processor 3 first reads the error flag 12 in the memory management unit (MMU) 1.

(ST7-2)

The processor 3 then refers to the error flag to judge whether the read error data is a true ECC error.

(ST7-3)

The processor 3 then performs normal ECC error processing when it is judged in step ST7-2 that the read error data is a true ECC error (Yes). Specifically, the processor 3 corrects the error in accordance with the received ECC data.

(ST7-4)

When it is judged in step ST7-2 that the read error data is not a true ECC error (No), the processor 3 brings currently running Process 1 (e.g., a process that requires reading of data in the NAND-type flash memory 2) into a waiting condition (WAIT).

(ST7-5)

The processor 3 then dispatches to the other process 2 runnable during this period (e.g., a process that does not require the data in the NAND-type flash memory 2).

(ST7-6)

The processor 3 then reads the completion flag 15 of the memory management unit (MMU) 1.

(ST7-7)

The processor 3 then judges whether the completion flag 15 is set. When the completion flag 15 is not set (No), the processor 3 returns to step ST7-6.

(ST7-8)

When judging in step ST7-7 that the completion flag 15 is set (Yes), the processor 3 brings the above-mentioned waiting process into a runnable condition.

3-2. Operation of the Entire Flat Memory in the Case of Dummy ECC

Now, the operation of the entire flat memory in the case where the memory management unit 1 has issued dummy ECC is described with reference to FIG. 18. This description concerns the operation of the flat memory in the case where the processor 3 judges in step ST7-2 that the read error data is not a true ECC error (No). Moreover, the processor 3 in this example is, by way of example, a multiprocessor comprising two processors 3a, 3b capable of running at least two processes 1, 2. The processor 3 is not exclusively the multiprocessor and may be a single processor capable of running a plurality of processes.

First, at a time t0, Process 1 (e.g., to read data from the DRAM 4 (ST1-1 to ST1-4)) is run condition, and the Process 2 is in a condition to be able to run. The Process 2 is not run.

At a time t1, that is, when the memory management unit 1 which has received the read command for Process 1 is to read data on the NAND-type flash memory 2, the memory management unit 1 transfers, to the processor 3, the dummy data 14 that causes the ECC error. The OS on the processor 3 receives the dummy data 14.

At a time t2, the OS which has received the dummy data 14 brings Process 1 into a waiting condition (WAIT) and switches from runnable process 2 (e.g., to read data from the DRAM 4 (ST1-1 to ST1-4)) to be run.

In the meantime, the memory management unit 1 controls at the same time so that data is read from the NAND-type flash memory 2 (ST3-5 to ST3-9, ST5-1 to ST5-8) in parallel with Process 2 which has been switched to.

At a time t3, in this example, Process 2 sends a system call to the OS.

At a time t4, the OS which has received the system call confirms the completion flag 15 of the memory management unit.

After ascertaining the completion, the OS which has confirmed the completion flag 15 at the time t5, brings waiting (wait condition) Process 1 again into a running condition.

<Alternative Methods>

The method whereby the memory management unit 1 informs the processor 3 of the completion of the process is not limited to the above-mentioned example. For example, the following alternative methods are applicable.

Alternative method 1: The memory management unit 1 informs the processor 3 by interrupt at the completion of the transfer from the NAND-type flash memory 2 to the DRAM 4.

Alternative method 2: Timer interrupt of the processor 3 is set for a point after the time required for the transfer from the NAND-type flash memory 2 to the DRAM 4. Once the interrupt is active, the completion flag 15 of the memory management unit 1 is checked.

4. Function/Advantages

As described above, at least the following advantage (1) can be obtained by the memory management unit and the memory management method according to the first embodiment.

(1) The useless halt condition can be advantageously prevented so that efficiency in memory access can be increased.

As described above, in the semiconductor storage device (flat memory) according to the first embodiment, the (short-access-time) fast DRAM 4 (an MRAM or the like may also do) and the (long-access-time) slow NAND-type flash memory 2 are connected to the memory bus 9 of the processor 3 in a mixed manner.

Here, the access time is, for example, about several ten to several hundred ns in the DRAM 4, and about several ten to several hundred is in the NAND-type flash memory 2. Thus, there is an access time difference of about 1000 times between the short-access-time memory and the long-access-time memory. More specifically, the access time is particularly needed for the operation of reading a page data to the data cache 22 from the memory cell array 21 of the NAND-type flash memory 2.

While the processor 3 is reading data from the long-access-time memory 2, the memory bus 9 or the memory management unit 1 is occupied by this operation, and the fast memory 2 cannot be accessed. Thus, a useless halt condition is produced during this period.

Therefore, the memory management unit 1 according to the first embodiment performs the following control.

(I) When the data to be accessed by the processor 3 is on the DRAM 4 (ST0-2), data is read from or data is written into the DRAM 4 (ST1-1 to ST1-4, ST2-1 to ST2-4).

(II) When the data to be accessed by the processor 3 is on the NAND-type flash memory 2, (i) the error flag 12 is set to indicate whether an error is an ECC error caused by dummy data or a true ECC error (ST0-3), or (ii) the dummy data 14 that causes the ECC error is issued and read into the processor 3 to stop the access by the processor 3 (ST0-4), or (iii) a corresponding page in the NAND-type flash memory 2 is read into a free page on the DRAM 4 (ST3-5 to ST3-9).

Here, the processor 3 which has detected the ECC error sees the error flag 12 and knows whether a true error has occurred or data is being read from the NAND-type flash memory 2 (ST7-1, ST7-2).

(iv) If data is being read from the NAND-type flash memory 2, Process 1 is brought into a waiting condition, and the other process 2 runnable during this period is run (ST7-4, ST7-5).

(v) When the reading from the NAND-type flash memory 2 to the DRAM 4 is finished, waiting Process 1 is made runnable (ST7-7, ST7-8).

According to the configuration and operation described above, Process 1 is brought into a waiting condition in response to the dummy data 14. The process is switched to the runnable process 2 (e.g., reading of data from the DRAM 4 (steps ST1-1 to ST1-4)). In parallel with Process 2 which has been switched to, data can be read from the NAND-type flash memory 2 (steps ST3-5 to ST3-9, steps ST4-1 to ST4-8).

As a result, even while data is being read from the long-access-time NAND-type flash memory 2, the short-access-time runnable process 2 can be performed. Thus, the short-access-time DRAM 4 can be accessed at the same time. It is therefore possible to advantageously prevent the useless halt condition of the processor 3 and increase the efficiency in memory access.

<Other Variations>

The configuration and method shown in this example do not exclusively serve to obtain the advantage (1) described above, and there are applicable variations. For example, the following variations 1. to 3. for solution can also be applied and provide similar advantages.

1. Although the ECC error is used to have access to the NAND 2, interrupt such as a bus error may be caused to inform the processor 3. In this case as well, a flag has to be prepared to judge whether a true bus error has occurred or there is a wait for access to the NAND.

2. A variation of the method that uses the ECC error so that the processor 3 which has been informed that data is being read from the NAND 2 knows the completion of caching from the NAND 2 to the DRAM 4:

A "completion flag" to report the completion of a page transfer from the NAND 2 to the DRAM 4 is prepared it the MMU 1 so that this flag can be read from the processor 3. The processor 3 checks the flag at regular times, and reexecutes the program if the transfer is completed.

The time taken for the page transfer from the NAND 2 to the DRAM 4 is checked in advance. The processor 3 waits during this time and then reexecutes the program.

When a plurality of NANDs different in transfer time such as the SLC and MLC are connected to the MMU 1, the waiting time is changed depending on which NAND to transfer from.

After the page transfer from the NAND 2 to the DRAM 4 is completed, interrupt to report the completion is caused to the processor 3.

3. Alternatively, a plurality of NANDs 2 having different characteristics such as the SLC and MLC may be connected to the memory management unit 1, as described later. When a plurality of NANDs 2 are connected, it should be noted that the error flag 12, the completion flag 15 and the last address 11 have to be prepared for each NAND so that other NANDs can be accessed while one NAND is being accessed.

Second Embodiment

Now, a memory management unit and a memory management method according to a second embodiment are described with reference to FIG. 19 to FIG. 30. This embodiment concerns an example of increasing the efficiency in memory access by changing a read thread in accordance with latency. Here, parts that are duplications of those in the first embodiment described above are not described in detail.

5. Configuration Example

5-1. System Configuration Example

First, a system configuration example according to the second embodiment is described with reference to FIG. 19.

As shown, in this example, one component of a processor 3 is a CPU 3a. Main memories (NAND-type flash memories 2, DRAM, other peripheral devices 50 and the like that are connected to the CPU 3a are shown.

The CPU 3a and the memory management unit (MMU) 1 are connected to each other by a DDR memory bus 9 which is a currently standard memory bus. In recent years, this DDR memory bus 9 can achieve a speed beyond, for example, about 3 Gbps. The DDR-type DRAM 4 and a plurality of NAND-type flash memories 2 are connected to the MMU 1. A PCI express bus is further connected to the CPU 3a. A high-speed video card can be connected to this PCI express bus. A modem 61, a hard disk (HHD) 62, a solid state drive (SSD) 63, and a PCI express card 64 connected to the PCI express bus which are normal peripheral devices are connected to the CPU 3a via a south bridge control chip 60.

5-2. Configuration Example of Flat Memory

Now, a configuration example of a flat memory according to this example is described with reference to FIG. 20.

As shown, cache memories L1, L2 are provided in micro processing units (MPU) and a graphic processing unit (GPU) which function as processors 3a to 3c. Although some of the recent MPUs comprise, as an L3 cache, a cache memory higher in capacity than the cache memories L1, L2, the MPUs 3b, 3c comprising the L1, L2 caches are illustrated in this example.

An MPU part as the processor 3 is composed of one CPU 3a and two MPUs 3b, 3c. These components are connected to the main memories (NAND-type flash memories 2, DRAM 4) via the memory management unit (MMU) 1.

Figure 22A:
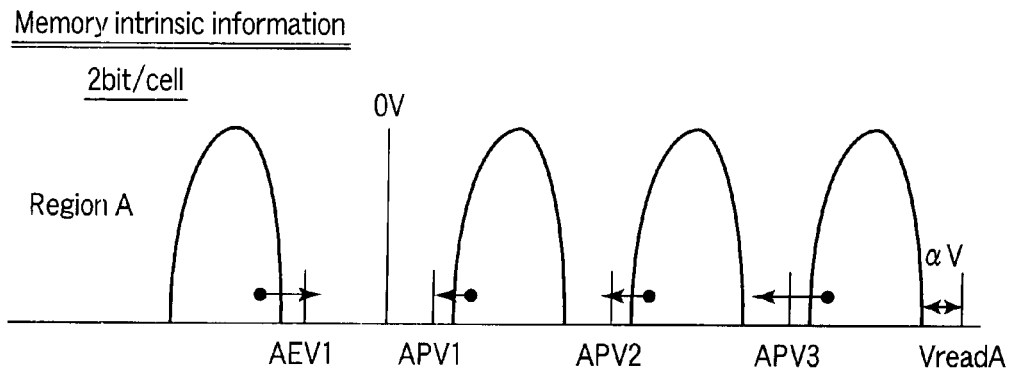
FIG. 22A is a diagram showing a data storage scheme (2-bit/cell) of the NAND-type flash memory.
Figure 22B:
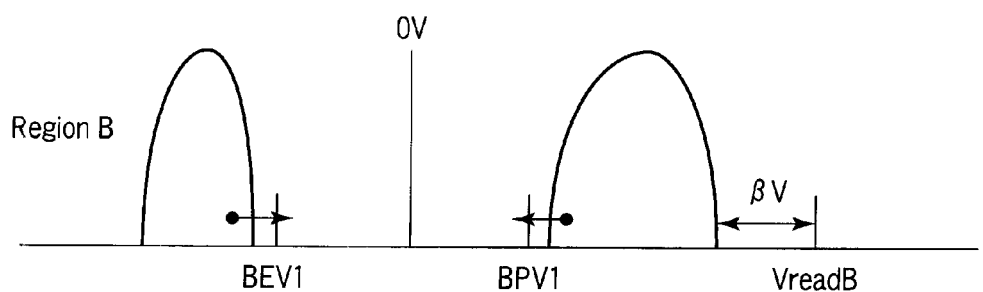
FIG. 22B is a diagram showing a data storage scheme (high-speed writing SLC (low read-disturb resistance)) of the NAND-type flash memory.
Figure 22C:
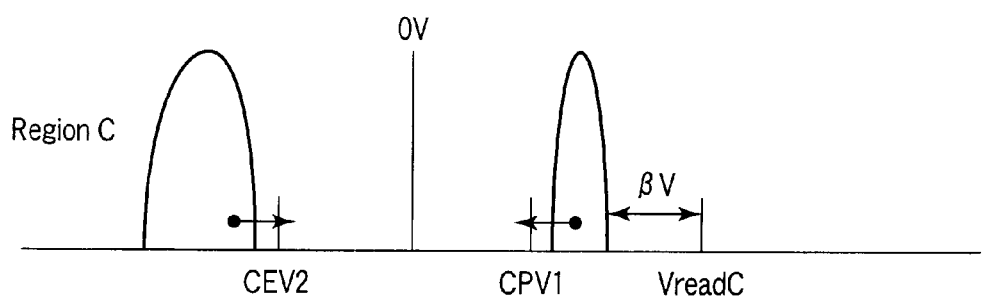
FIG. 22C is a diagram showing a data storage scheme (low-speed writing SLC (high read-disturb resistance)) of the NAND-type flash memory.

In this example, one DRAM 4 and three NAND-type flash memories 2S, 2Ma, 2Mb that serve as main memories are connected. The NAND-type flash memory 2S comprises a single level cell (SLC), and the other two NAND-type flash memories 2Ma, 2Mb comprise multilevel cells (MLC). Here, the SLC (binary NAND-type flash memory) is a NAND-type flash memory capable of storing one-bit data in one memory cell (MT), as shown in FIG. 22B and FIG. 22C. The MLC (multilevel NAND-type flash memory) is a NAND-type flash memory cell capable of storing multibit data in one memory cell (MT), as shown in FIG. 22A, FIG. 22D and FIG. 22E.

In order to accesses a memory, an MPU 115 in the memory management unit 1 issues a logical address for a reading or writing operation, and the memory management unit 1 converts this logical address to a physical address of an actual memory chip. The main memory in this example comprises the above-mentioned DRAM 4, SLC-NAND flash (2S) and MLC-NAND flashes (2Ma, 2Mb). The memory management unit 1 decides which address space to write data in.

5-3. Decision by the Memory Management Unit 1 as to Which Address Space to Write Data in Now, a process of deciding which address space to write data in is described with reference to FIG. 21. Static coloring information 74 is provided for a program and data dealt with in this example, as shown in FIG. 21. The static coloring information 74 serves to predict how frequently the created program and data are written, erased or read so that a programmer may add information selected from predetermined matrix information in accordance with the prediction to the program and data. For example, when starting with writing, the memory management unit 1 decides in accordance with the static coloring information 74 whether to write in the DRAM region 4, the SLC-NAND flash (2S) or the MLC-NAND flash (2Ma, 2Mb).

A work memory 116 temporarily stores access information issued by the processor 3 (MPU). Write data is temporarily stored in a cache DRAM memory 118. For example, a logical/physical conversion table 73, the static coloring information 74, memory intrinsic information 75 and dynamic coloring information 76 that are stored in predetermined regions of the NAND-type flash memory (2S) are automatically transferred to a information register 117 in the memory management unit 1 after power on.

After the same data is written/erased/read several times, a write address is decided referring not only to the static coloring information 74 but also to the dynamic coloring information 76. The dynamic coloring information 76 stores the number of writings/erasures/readings, which is compared with the memory intrinsic information and thus used to judge whether to write into an address based on the static coloring information 74 or into a region different from the static coloring information 74. For example, even if the static coloring information 74 indicates an access range having an upper limit number of writing/erasing times of 1000, an SLC region is selected without writing into an MLC region conforming to the static coloring information 74 when the life-end number of writing/erasing times estimated from the past number of writing/erasing times indicates 5000. Moreover, if the static coloring information 74 is not specified, the MMU 1 judges which chip in the main memory to write in from the dynamic coloring information 76.

5-4. Memory Intrinsic Information

Now, the memory intrinsic information is described with reference to FIG. 22A to FIG. 22E. The memory intrinsic information indicates what capacities of DRAM 4, SLC-NAND flash (2S) and the MLC-NAND flashes (2Ma, 2Mb) constitute the main memory that configures this system. The memory intrinsic information also indicates what kind of memory is allocated to a memory space.

FIG. 22A is a diagram showing a threshold distribution of a normal 2-bit/cell MLC. Such a 2-bit/cell is stored in the memory intrinsic information as an address space for storing a program or data estimated to be readable up to 10000 times for, for example, 1000 rewritins.

FIG. 22B shows a threshold distribution of a NAND flash memory which sacrifices read disturb reliability of the SLC-NAND flash to enable high-speed writing. As a program or data stored in this region, a program or data which is read 1000 times or less and which needs to be rewritten at high speed is allocated as the memory intrinsic information.

In FIG. 22C, the writing speed of the SLC-NAND flash is sacrificed, and a program or data which is calculated to require 100000 readings is allocated as the memory intrinsic information.

FIG. 22D shows a threshold distribution of a 3-bit/cell MLC-NAND flash memory. A program or data estimated to be written 500 times and read 1000 times or less can be saved in this region. Such a condition is allocated as the memory intrinsic information.

FIG. 22E shows a threshold distribution of a 4-bit/cell MLC-NAND flash memory. A program or data estimated to be written 100 times and read 1000 times or less can be saved in this region. Such a condition is allocated as the memory intrinsic information.

5-5. Memory Map Example

Now, a memory map example of the main memory according to this example is described with reference to FIG. 23.

Figure 23:
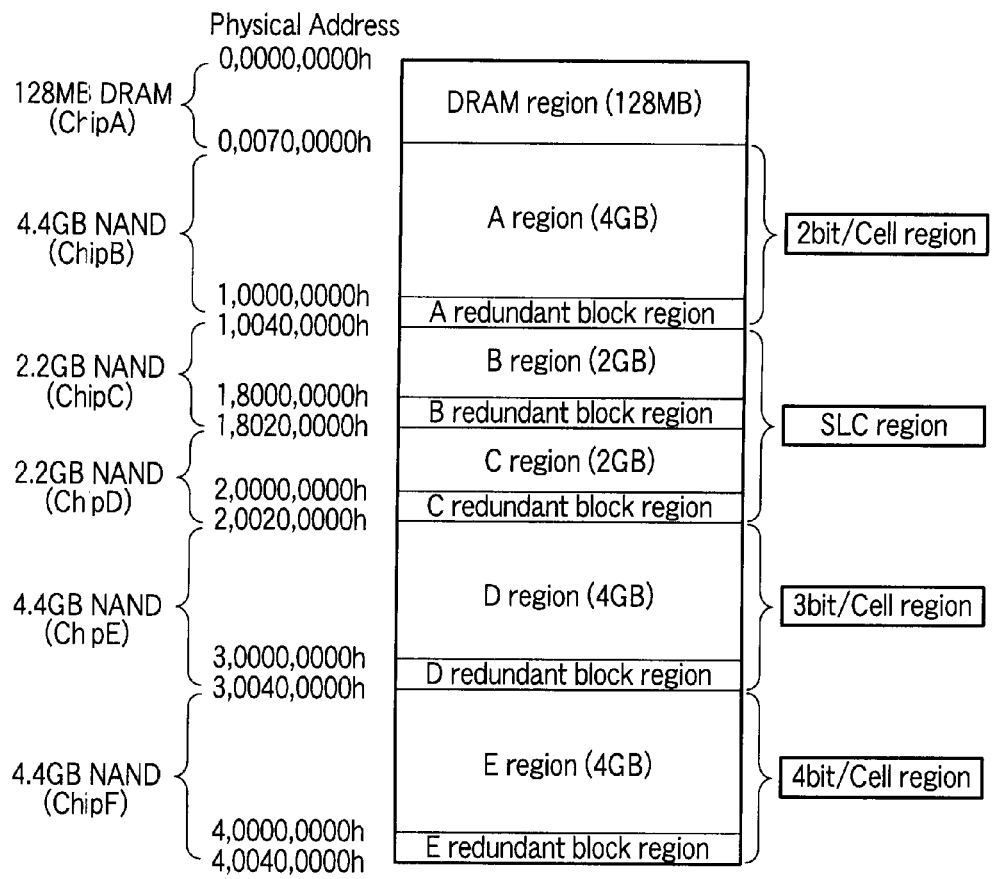
FIG. 23 is a diagram showing a memory map example of the NAND-type flash memory.

FIG. 23 shows an example of associating the DRAM 4, the SLC-NAND flash (2S) and the MLC-NAND flash (2Ma, 2Mb) in the memory map.

Except for a DRAM region, a redundant block region which uses the same writing method and which is about ten percent of each NAND flash memory region memory region is allocated to the memory region in addition to the memory region. This redundant block region is used when a main block being actually used is defective. The redundant block region is also used as a redundant region necessary when certain page data is to be rewritten and block data to which this page belongs is moved accordingly.

In this example, a request (function) issued by the MPU (3a to 3c) of the processor 3 to write into or read from a memory on a virtual address is converted to a physical address by the memory management unit (MMU) 1 so that data in a corresponding region is accessed. Rearrangement of the requests (functions) will be described later with reference to FIG. 25 to FIG. 28.

5-6. Configuration Example of Memory Management Unit (MMU)

Figure 24:
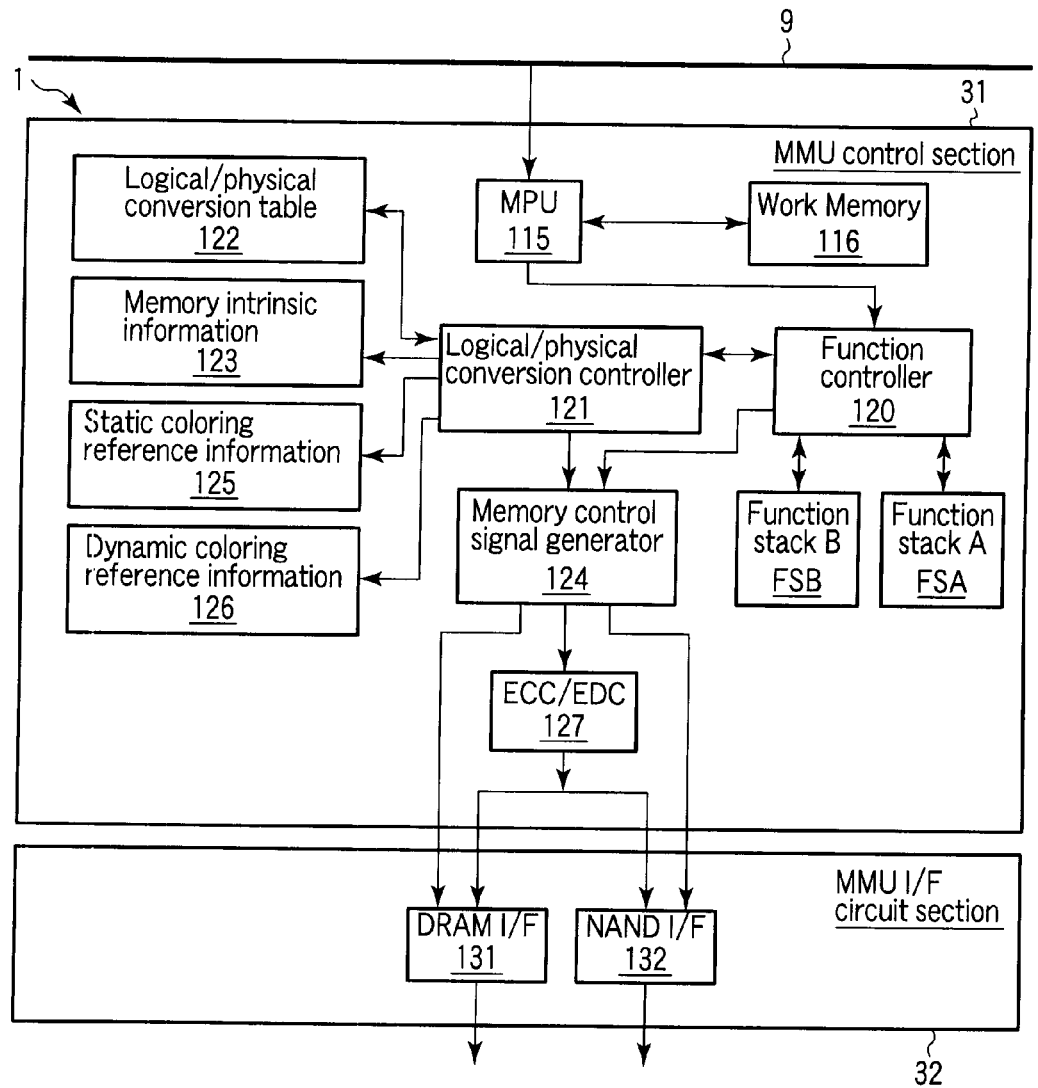
FIG. 24 is a block diagram showing a configuration example of the memory management unit (MMU) in FIG. 20.

Now, a configuration example of the memory management unit (MMU) 1 according to the second embodiment is described with reference to FIG. 24. As shown, the memory management unit (MMU) 1 comprises an MMU control section 31 and an MMU I/F circuit section 32.

The DDR memory bus 9 connected to the CPU is connected to the MPU 115 in the MMU control section 31.

The MPU 115 processes memory access requests provided by an external CPU via the DDR memory bus 9. The memory access requests are first fetched to and stored in the work memory 116 connected to the MPU 115. The MPU 115 sequentially transfers the fetched requests to a function controller 120.

The function controller 120 stores sequential memory access requests in a function stack A (FSA). This state corresponds to a pre-change condition described later with reference to FIG. 25.

The function controller 120 further rearranges the memory access requests stacked in the function stack A (FSA) in accordance with coloring information 125, 126 for a physical address obtained via a logical/physical conversion circuit 121, and stores the memory access requests in a function stack B (FSB). This condition corresponds to a post-change condition described later with reference to FIG. 27.

The logical/physical conversion circuit 121 refers to the static coloring reference information 125, the dynamic coloring reference information 126 and memory intrinsic information 123, thereby judging before memory processing whether a plurality of pieces of memory access information stored in the function stack A (FSA) are written into the DRAM region, SLC-NAND flash region, MLC (2-bit/cell)-NAND flash region, MLC (3-bit/cell)-NAND flash region or MLC (4-bit/cell)-NAND flash region.

In accordance with the judgment, the function controller 120 decides which function to execute in parallel with which function to produce the optimum performance. As a result of the decision, the memory access requests are rearranged by the function controller 120 and stored in the function stack B (FSB). Memory accesses are sequentially processed in the order of stacking in the function stack B (FSB). The address accessed by each function stack B (FSB) has already been decided by the logical/physical conversion circuit 121. This address information and writing/reading function request information are sent to a memory control signal generator 124.

The memory control signal generator 124 sends the address to be accessed or a control signal to a DRAM I/F 131 or a NAND I/F 132, and sends write data to the DRAM I/F 131 or the NAND I/F 132 via an ECC/EDC circuit 127.

When the address indicates the DRAM region, the memory control signal generator 124 transfers the control signal and write data to the DRAM I/F 131 via the DDR memory bus. In this case, the ECC/EDC circuit 127 functions as a 1-bit error correction/2-bit error detection circuit. An optimum number is properly selected for the capability of correcting such an ECC depending on a memory device to be connected.

When the address indicates the SLC-NAND flash region, the memory control signal generator 124 transfers a control signal and write data to the NAND I/F 132 via a NAND flash memory bus. In this case, the ECC/EDC circuit 127 functions as an 8-bit error correction/9-bit error detection circuit.

When the address indicates the MLC-NAND flash region, the memory control signal generator 124 transfers the control signal and write data to the NAND I/F 132 via the NAND flash memory bus. The ECC/EDC circuit 127 functions as an error correction circuit for 24 bits or more.

Thus, the ECC/EDC circuit 127 has error correction power varying depending on a target address region to be accessed. This enables the delay of a DRAM access to be minimized and also enables the access delay of the SLC-NAND flash to be less than the access delay of the MLC-NAND flash. This is advantageous in that performance can be optimized in accordance with coloring data to be processed.

6. Rearrangement of Reading Functions

Now, rearrangement of the reading function requests by the memory management unit (MMU) 1 is described with reference to FIG. 25 to FIG. 28.

6-1. Read Request (Before Change)

First, a pre-change reading function request and latency are described with reference to FIG. 25 and FIG. 26.

Figure 25:
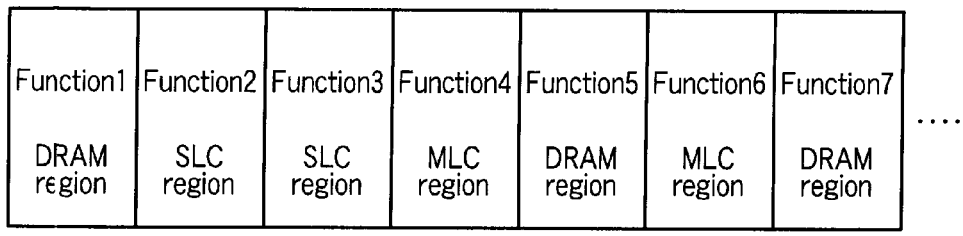
FIG. 25 is a diagram showing pre-change reading function requests.

As shown in FIG. 25, seven read commands (Function 1 to Function 7) are consecutive in this example. Each read destination is converted by the memory management unit (MMU) 1. In Function 1, predetermined data is read from the address space of the DRAM region. In Function 2, predetermined data is read from the SLC-NAND flash region. Similarly, data is read from the address space of the SLC region in Function 3. Data is read from the address space of the MLC region in Function 4. Data is read from the address space of the DRAM region in Function 5. Data is read from the address space of the MLC region in Function 6. Data is read from the address space of the address space of the DRAM region in Function 7.

Figure 26:
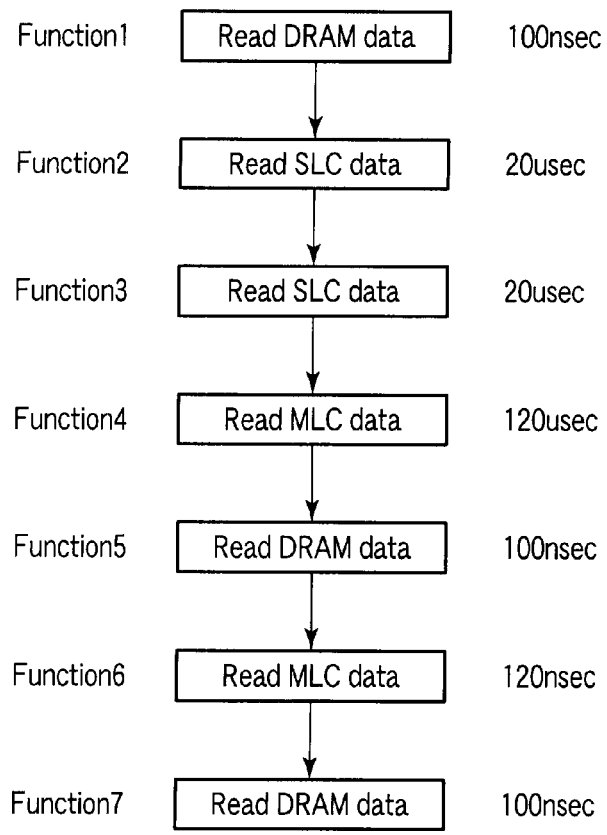
FIG. 26 is a flowchart showing pre-change latency.

As shown in FIG. 26, when Function 1 to Function 7 are sequentially performed, data can be read with a latency of 100 nsec in Function 1, but a latency of 20 usec is required in Function 2. When data is read from the MLC region in Function 4, a latency of 120 usec is required, so that the data is read at a speed 1200 times lower than that in the case of the DRAM.

Therefore, a wait of 160.1 sec is required to read the data in the DRAM 4 in Function 5. Moreover, if a request to read data in the SLC or MLC region is made, the MPU is idle until the data is read, and the performance of the MPU considerably deteriorates.

Thus, in this example, the function commands issued from the MPU (3a to 3c) of the processor are stacked in the function stack A (FSA) in the memory management unit (MMU) 1. During the operation of reading the SLC or MLC, the operation of reading/writing the DRAM 4 is performed in parallel, thereby enhancing the performance.

6-2. Read Request (After Change)

Next, post-change reading function requests and latency are described with reference to FIG. 27 and FIG. 28.

As shown in FIG. 27, the original read requests (before change) from the MPU shown in the upper part of the diagram are rearranged by the memory management unit 1, as indicated by boxes in FIG. 27. More specifically, the memory management unit 1 rearranges a plurality of functions as post-change memory access requests so that at least one second function (e.g., Read 2, Read 3, Read 4) having a latency shorter than that of the first function can be performed between the plurality of functions and the first latency of the first function (e.g., Read 1, Read 5) having a long latency.

More specifically, as shown in FIG. 28, in this example, the memory management unit 1 first reads (Read 1) the MLC region having a long latency, and then reads the SLC region in Read 2 while a busy time of 120 usec is being produced. The latency of Read 2 is 20 usec, and the subsequent sequential readings require 4 kB×20 nsec=80 usec. As a result, reading (80 usec+20 usec) for Read 2 can be finished during a busy time of 120 usec.

The memory management unit 1 then reads (Read 3) the SLC region in Function 3. The latency of this reading is 20 usec. During this period, reading (Read 4) of the DRAM 4 having a latency of 100 nsec can be performed in parallel. The control performed in this case is similar to that shown in the first embodiment described above.

The memory management unit 1 then reads data in the MLC region (Read 5). During a latency of this reading of 120 usec, data can be read from the DRAM 4 (Read 6, Read 7) in parallel. The control performed in this case is similar to that shown in the first embodiment described above.

Thus, the memory management unit (MMU) 1 according to this example stacks the pre-change memory access requests issued by the MPU in the function stack A (FSA), and rearranges a plurality of functions so that, among the functions, at least one second function which ends during the first latency of the first function having a long latency and which has a latency shorter than that of the first function can be performed at the same time. The rearranged functions are stored in the function stack B (FSB) and run.

Therefore, while the memory access (first function) having a long latency is performed, reading processing (second function) having a short latency can be performed in parallel. As a result, the effective performance of the memory access can be advantageously improved.

7. Function/Advantages

As described above, according to the memory management unit and the memory management method in the second embodiment, at least advantages similar to those in the first embodiment described above can be brought about. Moreover, according to the second embodiment, the following advantage (2) can be brought about.

(2) The memory access requests are rearranged so that the memory access in the memory management unit 1 can be optimized and the processing power of the processor 3 can be further improved.

The memory management unit (MMU) 1 according to the second embodiment further comprises the function controller 120. The function controller 120 stores pre-change memory access requests (e.g., FIG. 25) in the function stack A (FSA). The function controller 120 then rearranges the memory access requests stacked in the function stack A (FSA) in accordance with the coloring information 125, 126 for the physical address obtained via the logical/physical conversion circuit 121 (more specifically, the memory management unit 1 rearranges a plurality of functions as post-change memory access requests so that, among the functions, at least one second function (e.g., Read 2, Read 3, Read 4) having a latency shorter than that of the first function can be performed during the first latency of the first function (e.g., Read 1, Read 5) having a long latency). The function controller 120 then stores the rearranged memory access requests in the function stack B (FSB).

According to the configuration described above, reading efficiency can be increased by changing a read thread received by the memory management unit 1. The threads in the original order are performed so that multilevel reading threads have precedence, and the thread of reading the DRAM 4 is performed using the latency time of the NAND-type flash memory 2. Among the read requests from the multiprocessor 3, the execution process to proceed in the next processing as a result of the reading access to the DRAM 4 can be executed without waiting for the end of the processing of the read requests to the NAND 2 in other processors. Thus, the substantial processing power of the processor 3 can be advantageously further improved.

Modification 1

One Example of 3-Channel Configuration

Now, a memory management unit and a memory management method according to Modification 1 are described with reference to FIG. 29. Modification 1 concerns an example of a 3-channel configuration of the connection of the NAND-type flash memory. Here, parts that are duplications of those in the above second embodiment are not described in detail.

Figure 29:
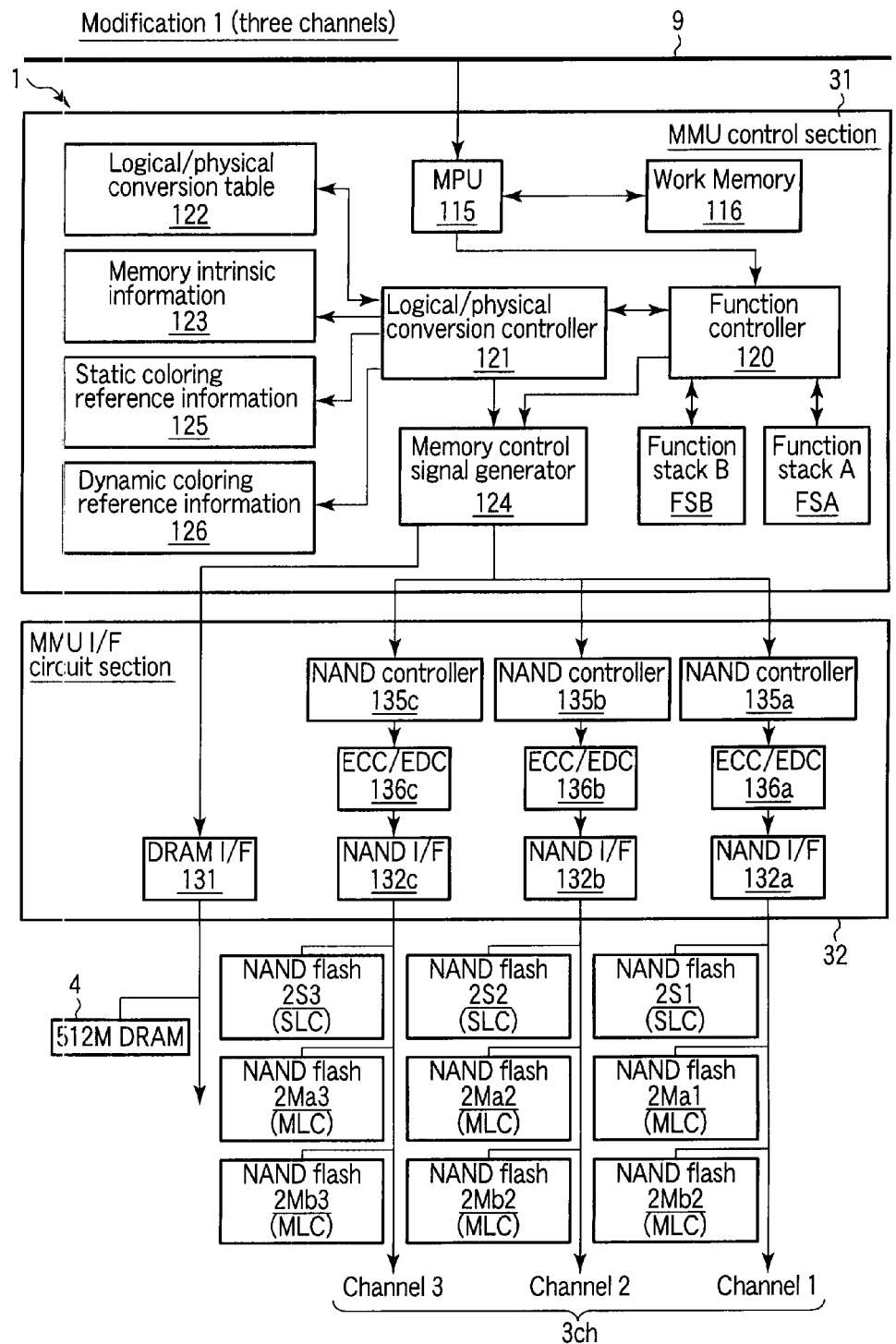
FIG. 29 is a block diagram showing a memory management unit according to Modification 1.

As shown in FIG. 29, a NAND-type flash memory 2 controlled by a memory management unit 1 is configured to be able to simultaneously access three channels in this example.

Each of Channels 1 to 3 has an SLC region and MLC regions.

When the NAND-type flash memory 2 is accessed, a memory control signal generator 124 issues sequential access requests to three channels of NAND controllers 135a to 135c, and the access requests are fetched to The respective NAND controllers 135a to 135c. The access requests are processed in parallel by the three NAND controllers 135a to 135c, and transferred to and processed by the NAND-type flash memories connected to Channels 1 to 3 via ECC/EDC circuits 136a to 136c.

In writing processing according to Modification 1, when there are, for example, write requests to three MLC regions and write requests to three SLC regions, a function controller 120 first gives priority to the writing into the MLC regions of the respective channels, and then relocates the writings for the three SLC regions (2S1 to 2S3) behind. Among the functions the order of which has been changed by the function controller 120, the function controller 120 fetches the first three write requests to the three MLCs to the NAND controllers 135a to 135c of Channel 1 to Channel 3. Further, three processes are performed in parallel by the NAND controllers 135a to 135c. The writing time of the MLC-NAND-type flash memories (2Ma1 to 2Mb3) is about 1 msec and long. Therefore, the chip is busy during this period. The write requests to the following three SLC-NAND-type flash memories (2S1 to 2S3) are fetched to the NAND controllers 135a to 135c of Channel 1 to Channel 3 and executed thereby.

As a result, writing into the SLC-NAND-type flash memories (2S1 to 2S3) of the three channels can be first finished before the end of the preceding writing into the MLC-NAND-type flash memories (2Ma1 to 2Mb3). Thus, the function controller 120 changes the order of the NAND commands in consideration of the writing/reading latencies of the three NAND channels, and gives priority to three-channel simultaneous operation. Thereby, parallel processing of the NAND flashes can always be performed, and performance can be further improved.

<Function/Advantages>

As described above, according to the memory management unit and the memory management method in Modification 1, at least advantages similar to (1) and (2) can be brought about.

Furthermore, the memory management unit 1 according to Modification 1 is different from that in the second embodiment described above in that an MMU I/F circuit section 32 includes the three NAND controllers 135a to 135c, ECC/EDC circuits 136a to 136c and NAND I/F 132a to 132c to adapt to the three-channel configuration of the NAND-type flash memory.

Thus, the function controller 120 changes the order of the NAND commands in consideration of the writing/reading latencies of the three NAND channels, and gives priority to three-channel simultaneous operation. Thereby, advantageously, parallel processing of the NAND flashes can always be performed, and performance can be further improved.

Furthermore, this example can be applied as needed when the NAND-type flash memory has a multichannel configuration.

Modification 2

One Example of Data Output

Now, a memory management unit and a memory management method according to Modification 2 are described with reference to FIG. 30. Modification 2 concerns an example of data output. Here, parts that are duplications of those in the above second embodiment are not described in detail.

As shown in FIG. 30, in the case described in this example, a DRAM 4 or a NAND flash memory 2 outputs data from a predetermined address in accordance with read requests the order of which has been changed.

As shown, data read from a memory chip (the DRAM 4 or the NAND-type flash memory 2) is, if erroneous, corrected by an ECC/EDC circuit 127 via a DRAM I/F 131 and a NAND I/F 132. If not erroneous, the data merely passes through the ECC/EDC circuit 127 and is stored in a work memory 116 of an MMU control section 31.

As described above, the function controller 120 refers to a function stack A (FSA) and a function stack B (FSB) in order to decipher which read command issued by a host processor 3 the read data corresponds to.

The function controller 120 rearranges data stacked in the work memory 116 in the order of the read commands which have been issued by the host processor 3 and which are stored in the function stack A (FSA).

The data is then transferred to the host processor 3 from the work memory 116 via a DDR memory bus 9 in the order of the rearranged commands issued by the host processor 3.

At the end of this transfer, memory access information stored in the function stack A (FSA) and the function stack B (FSB) is erased/cleared from the stack.

Thus, a memory management unit 1 converts the order of actual memory accesses in accordance with memory intrinsic information that stores information on a memory region including coloring information and channel information. The memory management unit 1 then accesses the memories, and transfers the read memory information to the host processor 3. In this case, the data read from the memories is output and returned not in the access order converted by the memory management unit 1 but in the original memory access order by the host processor 3. Therefore, even in the case of data output, the performance of the whole memory system can be advantageously improved.

<Function/Advantages>

As described above, according to the memory management unit and the memory management method in Modification 2, at least advantages similar to (1) and (2) can be brought about.

Furthermore, when transferring the read memory information to the host processor 3, the memory management unit 1 according to Modification 2 outputs and returns the data read from the memories, not in the access order converted by the memory management unit 1 but in the original memory access order by the host processor 3. Therefore, even in the case of data output, the performance of the whole memory system can be advantageously improved.

In the embodiments and modifications described above, the work memory 116 connected to the processor 3 in the memory management unit 1 is not exclusively disposed in the MMU control section 31. For example, the present invention can also be applied and provide similar advantages when a part of the head of the DRAM region 4 serving as the main memory is used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system which is configured to communicate with a processor, comprising:
   a memory management unit including a holding area for holding a flag;
   a first memory coupled to the memory management unit; and
   a second memory coupled to the memory management unit, wherein data stored in the first memory is cached to the second memory;
   wherein, in response to a read access from the processor, the memory management unit:
   judges whether read-data to be accessed is stored in the second memory;
   sets an error flag to the holding area when the read-data is not stored in the second memory;
   transmits a dummy data to the processor to cause error correction error in the processor; and
   reads the read-data to be accessed from the first memory and stores the read-data in the second memory.

2. The memory system of claim 1, wherein the memory management unit sets a completion flag to the holding area when the memory management unit completes storing the read-data in the second memory.

3. The memory system of claim 1, wherein the memory management unit accesses the read-data stored in the second memory without transmitting the dummy data to the processor when the read-data is stored in the second memory.

4. The memory system of claim 1, further comprising:
an access command queue configured to hold an access command received from the processor; and
an access command manager;
wherein when the access command queue holds a first and second access command in an order of the first access command and the second access command, the second command having longer process latency than the first command, the access command manager rearranges access commands in the access command queue in an order of the second access command and the first access command.

5. The memory system of claim 1, wherein
the memory management unit manages to provide the first memory and the second memory as a main memory to the processor.

6. The memory system of claim 1, wherein the first memory is configured by a NAND-type flash memory, and the second memory is configured by dynamic random access memory (DRAM).

7. A memory management method which communicates with a processor, the memory management method comprising:
judging whether read-data to be accessed is stored in a second memory;
setting an error flag when the read-data is not stored in the second memory;
transmitting a dummy data to the processor to cause error correction error in the processor; and
reading the read-data to be accessed from a first memory and storing the read-data in the second memory.

8. The memory management method of claim 7, further comprising, at completion of the storing the read-data in the second memory, setting a completion flag.

9. The memory management method of claim 7, further comprising
when the read-data is stored in the second memory, accessing the read-data stored in the second memory without transmitting the dummy data.

* * * * *